United States Patent
Kim et al.

(10) Patent No.: US 11,835,224 B2
(45) Date of Patent: Dec. 5, 2023

(54) ELECTRONIC DEVICE AND CONTROLLING METHOD OF THE SAME

(71) Applicant: SAMSUNG ELECTRONICS CO., LTD., Suwon-si (KR)

(72) Inventors: Hyungchul Kim, Suwon-si (KR); Hakjae Kim, Suwon-si (KR); Kihong Park, Suwon-si (KR); Wonjun Baek, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 30 days.

(21) Appl. No.: 17/550,790

(22) Filed: Dec. 14, 2021

(65) Prior Publication Data
US 2022/0299189 A1    Sep. 22, 2022

Related U.S. Application Data

(63) Continuation of application No. PCT/KR2021/013376, filed on Sep. 29, 2021.

(30) Foreign Application Priority Data

Mar. 18, 2021 (KR) .......... 10-2021-0035555
May 31, 2021 (KR) .......... 10-2021-0070134

(51) Int. Cl.
*F21V 7/04* (2006.01)
*F21V 29/61* (2015.01)
*F21V 23/00* (2015.01)

(52) U.S. Cl.
CPC .............. *F21V 7/04* (2013.01); *F21V 23/003* (2013.01); *F21V 29/61* (2015.01)

(58) Field of Classification Search
CPC .................................. F21V 7/04; F21V 29/61
(Continued)

(56) References Cited

U.S. PATENT DOCUMENTS 5,367,439 A * 11/1994 Mayer ................. G02B 6/0008
362/18
7,360,900 B2 * 4/2008 Sakata ................. H04N 9/315
349/8
(Continued)

FOREIGN PATENT DOCUMENTS

JP    2015-90405 A    5/2015
JP    2019-28320 A    2/2019
(Continued)

OTHER PUBLICATIONS

International Search Report dated Jan. 21, 2022, issued by the International Searching Authority in International Application No. PCT/KR2021/013376 (PCT/ISA/210 and PCT/ISA/237).

*Primary Examiner* — Bryon T Gyllstrom
(74) *Attorney, Agent, or Firm* — Sughrue Mion, PLLC

(57) ABSTRACT

An electronic device and a method of controlling an electronic device are provided. The electronic device includes a main body; a light source provided inside the main body, the light source being configured to emit an output light; a projection lens configured to project the output light of the light source; and a cover configured to be selectively adjacent to or distanced from the projection lens, open or close the projection lens, and based on being adjacent to the projection lens, receive the output light projected by the projection lens and diffuse and emit the output light.

16 Claims, 20 Drawing Sheets

(58) Field of Classification Search
USPC .................................................. 362/311.01
See application file for complete search history.

(56) References Cited

U.S. PATENT DOCUMENTS

| | | | | |
|---|---|---|---|---|
| 7,775,686 | B2* | 8/2010 | Dalton | F21L 4/027 |
| | | | | 362/127 |
| 9,664,992 | B2 | 5/2017 | Yamauchi et al. | |
| 9,927,077 | B1* | 3/2018 | Fowkes | H01M 12/06 |
| 2004/0057232 | A1* | 3/2004 | Poon | F21V 31/03 |
| | | | | 362/198 |
| 2008/0205470 | A1* | 8/2008 | Ihar | G02B 27/0927 |
| | | | | 372/50.23 |
| 2010/0110694 | A1* | 5/2010 | Allen | F21V 7/0025 |
| | | | | 362/296.01 |
| 2012/0155091 | A1* | 6/2012 | Takatori | F21S 4/28 |
| | | | | 362/311.01 |
| 2013/0250564 | A1* | 9/2013 | Lau | F21V 13/02 |
| | | | | 362/186 |
| 2014/0009934 | A1* | 1/2014 | Huang | F21V 29/763 |
| | | | | 29/428 |
| 2015/0124224 | A1 | 5/2015 | Yamauchi et al. | |
| 2019/0265583 | A1 | 8/2019 | Takahashi et al. | |
| 2019/0323680 | A1* | 10/2019 | Wang | F21V 17/12 |
| 2020/0149706 | A1* | 5/2020 | Khosla | F21V 5/007 |

FOREIGN PATENT DOCUMENTS

| | | |
|---|---|---|
| JP | 6531019 B2 | 6/2019 |
| JP | 2019-145439 A | 8/2019 |
| JP | 6706331 B2 | 6/2020 |
| JP | 2022-135481 A | 9/2022 |
| KR | 10-1991-0000706 B1 | 1/1991 |
| KR | 2002-0057508 A | 7/2002 |
| KR | 10-2003-0067325 A | 8/2003 |
| KR | 10-2005-0104565 A | 11/2005 |
| KR | 10-0708501 B1 | 4/2007 |
| KR | 10-0811032 B1 | 3/2008 |
| KR | 10-2008-0075640 A | 8/2008 |
| KR | 10-1034906 B1 | 5/2011 |
| KR | 10-1324081 B1 | 10/2013 |
| KR | 10-1665559 B1 | 10/2016 |
| KR | 10-1710902 B1 | 3/2017 |
| KR | 10-2018-0089661 A | 8/2018 |
| KR | 10-2019-0105264 A | 9/2019 |

* cited by examiner

ELECTRONIC DEVICE AND CONTROLLING METHOD OF THE SAME

CROSS-REFERENCE TO RELATED APPLICATION(S)

This application is a bypass continuation of International Application No. PCT/KR2021/013376, filed on Sep. 29, 2021, which is based on and claims priority to Korean Patent Application No. 10-2021-0070134, filed on May 31, 2021 in the Korean Intellectual Property Office, and Korean Patent Application No. 10-2021-0035555, filed on Mar. 18, 2021, in the Korean Intellectual Property Office, the disclosures of which are incorporated by reference herein in their entireties.

BACKGROUND

1. Field

The disclosure relates to an electronic device and a controlling method thereof, and more particularly, to an electronic device that includes a cover diffusing an output light, and a controlling method thereof.

2. Description of Related Art

Following the development of technologies, electronic devices equipped with various optical output functions are being developed, and for example, there may be display devices, illumination devices, portable communication devices, and projectors. Among them, a projector is an electronic device that enlarges and projects a light output from a light source to a wall or a screen through a projection lens.

A conventional electronic device equipped with a projector function is aimed at transmitting content, and thus the device is equipped with an image screen output function and an audio transmission function. When the device is not outputting an image, there is a limitation on additional extension of usability other than output of audio. Accordingly, research for extending usability of an electronic device equipped with a projector function according to users' demands is being performed.

SUMMARY

Provided are an electronic device and a controlling method thereof, wherein the electronic device includes a cover that diffuses an output light projected from a projection lens in a horizontal direction, and accordingly, a light source included in the electronic device can be utilized for illumination.

Also provided are an electronic device and a controlling method thereof that may recognize a coupled state or a use environment of a cover through a sensor part and control an output light based on this to extend usability, thereby overcoming a physical limitation on applicability as a single electronic device.

Additional aspects will be set forth in part in the description which follows and, in part, will be apparent from the description, or may be learned by practice of the presented embodiments.

According to an aspect of the disclosure, an electronic device includes: a main body; a light source provided inside the main body, the light source being configured to emit an output light; a projection lens configured to project the output light of the light source; and a cover configured to be selectively adjacent to or distanced from the projection lens, open or close the projection lens, and based on being adjacent to the projection lens, receive the output light projected by the projection lens and diffuse and emit the output light.

The cover may include a reflecting layer configured to reflect the output light projected by the projection lens; and a diffusing layer configured to diffuse the output light projected by the projection lens.

The reflecting layer may formed on one surface of the diffusing layer, and the reflecting layer may be further configured to reflect the output light which passes through the diffusing layer.

An output hole may be provided in the reflecting layer, and at least a part of the output light may pass through the output hole to be emitted outside of the cover.

A portion of the diffusing layer may extend inside the output hole and diffuse the output light inside the output hole.

The cover may include a reflecting plate which extends in a side surface direction of the reflecting layer, the reflecting plate being bendable in a lower direction, and the reflecting plate may include a lower surface that includes a light reflecting material.

The cover may include a reflector provided inside the cover, the reflector being configured to reflect the output light projected by the projection lens in a predetermined direction.

The reflector may have a shape which extends from an upper surface of the cover in a direction toward the projection lens, and the shape may have a cross-sectional area that decreases from the upper surface of the cover to the projection lens.

The electronic device may further include a case provided on an outer circumferential surface of the main body, the case being configured to, based on the cover being adjacent to the projection lens, receive the output light diffused from the cover, and the case may include an outer surface configured to emit at least a part of the output light, and an inner surface configured to reflect the output light.

The case may further include a diffusing member configured to diffuse the output light between the outer surface and the inner surface.

According to an aspect of the disclosure, a method of controlling an electronic device includes: emitting an output light by a light source inside a main body; outputting an image by projecting the output light passing through a projection lens; coupling a cover which is adjacent to an upper part of the projection lens, wherein the cover is configured to receive and diffuse the output light projected by the projection lens; and driving the light source in an illumination mode by controlling the light source based on the coupling of the cover.

The coupling of the cover may include performing a first coupling of the cover and the projection lens while the cover and the projection lens are distanced from each other; and performing a second coupling of the cover and the projection lens while the cover and the projection lens are less distanced from each other than in the first coupling, and wherein the driving the light source in the illumination mode may include recognizing the first coupling or the second coupling; and controlling the driving of the light source to correspond to the recognized first coupling or the recognized second coupling.

The performing of the second coupling may include transmitting the output light diffused from the cover to a case enclosing an outer circumferential surface of the main body, and emitting the output light in the illumination mode through the outer circumferential surface of the case.

The driving the light source in the illumination mode may further include, based on the second coupling being recognized, increasing driving of a cooling fan inside the main body.

The method may further include, after the coupling the cover, recognizing a surrounding environment of the electronic device, a location of a user, and a state of the user, the driving the light source in the illumination mode may include controlling the driving of the light source based on a result of the recognizing of the surrounding environment, the location of the user, and the state of the user.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
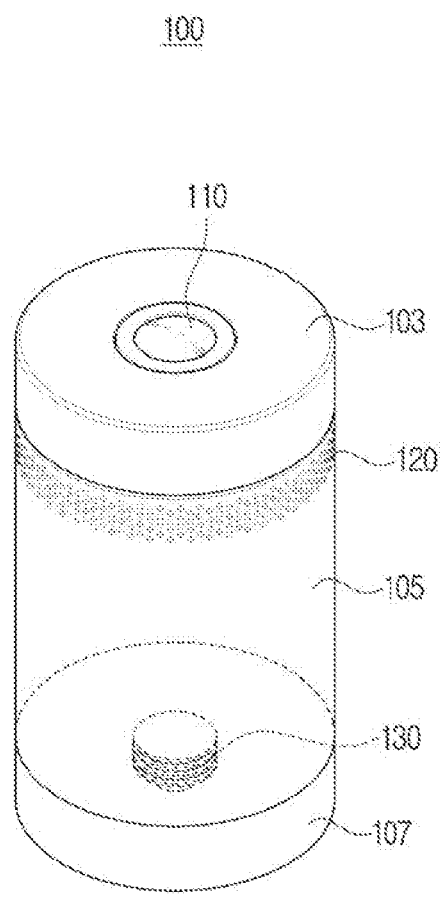
FIG. 1 is a perspective view illustrating an exterior of an electronic device according to an embodiment of the disclosure.

First, terms used in this specification will be described briefly, and then the disclosure will be described in detail. In the disclosure, detailed explanation regarding related known technologies may be omitted, and overlapping explanation of the same components will be omitted as much as possible.

As terms used in the embodiments of the disclosure, general terms that are currently used widely were selected as far as possible, in consideration of the functions described in the disclosure. However, the terms may vary depending on the intention of those skilled in the art who work in the pertinent technical field, previous court decisions, or emergence of new technologies. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to specific embodiments, but they should be interpreted to include all modifications, equivalents, or alternatives included in the ideas and the technical scopes disclosed herein. Also, in describing the embodiments, in case it is determined that detailed explanation of related known technologies may confuse the gist of the disclosure, the detailed explanation will be omitted.

In addition, the various embodiments of the disclosure and the terms used in the embodiments are not intended to limit the technical characteristics described in the disclosure to specific embodiments, but they should be interpreted to include various modifications, equivalents, or alternatives of the embodiments. With respect to the detailed description of the drawings, similar or related components may be designated by similar reference numerals. Also, a singular form of a noun corresponding to an item may include one or a plurality of the item, unless instructed obviously differently in the related context. Further, in the disclosure, each of the phrases "A or B," "at least one of A and B," "at least one of A or B," "A, B, or C," "at least one of A, B, and C," and "at least one of A, B, or C" may include any one of the items listed together with the corresponding phrase among the phrases, or all possible combinations thereof. In addition, terms such as "first," "second," and the like may be used just to distinguish a component from another component, and are not intended to limit a component in another aspect (e.g.: importance or order). In case it is mentioned that a component (e.g.: a first component) is "coupled" or "connected" with another component (e.g.: a second component) together with terms such as "functionally" and "communicatively" or without such terms, it means that the component may be connected with the another component directly (e.g.: in a wired manner), wirelessly, or through a third component.

Also, terms such as "first," "second," and the like may be used to describe various components, but the components are not intended to be limited by the terms. The terms are used only to distinguish one component from another component. For example, a first component may be called a second component, and a second component may be called a first component in a similar manner, without departing from the scope of the disclosure.

Further, singular expressions include plural expressions, as long as they do not obviously mean differently in the context. In addition, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In the disclosure, "a module" or "a part" may perform at least one function or operation, and it may be implemented as hardware or software, or as a combination of hardware and software. Also, a plurality of "modules" or "parts" may be integrated into at least one module and implemented as at least one processor, excluding "a module" or "a part" that needs to be implemented as specific hardware.

Also, the term "module" used in the various embodiments of the disclosure may include a unit implemented as hardware, software, or firmware, and it may be interchangeably used with terms, for example, logic, a logical block, a component, or a circuit. In addition, a module may be a component including an integrated body or a minimum unit of the component or a portion thereof performing one or more functions. For example, according to an embodiment of the disclosure, a module may be implemented in the form of an application-specific integrated circuit (ASIC).

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

Further, while the embodiments of the disclosure will be described in detail with reference to the following accompanying drawings and the content described in the accompanying drawings, it is not intended that the disclosure is restricted or limited by the embodiments.

Hereinafter, an electronic device according to embodiments of the disclosure will be described in detail with reference to FIG. 1 to FIG. 13.

FIG. 1 is a perspective view illustrating an exterior of an electronic device 100 according to an embodiment of the disclosure. Referring to FIG. 1, the electronic device 100 may include a head 103, a main body 105, a projection lens 110, a plurality of openings 120, a connector 130, and a cover 107.

The electronic device 100 may be devices in various forms. In particular, the electronic device 100 may be a projector device that enlarges and projects an image to a wall or a screen, and the projector device may be a liquid crystal display (LCD) projector or a digital light processing (DLP) type projector that uses a digital micromirror device (DMD).

Also, the electronic device 100 may be a display device for households or for an industrial use. Alternatively, the electronic device 100 may be an illumination device used in everyday lives, or an audio device including an audio module, and it may be implemented as a portable communication device (e.g.: a smartphone), a computer device, a portable multimedia device, a wearable device, or a home appliance, etc. The electronic device 100 according to an embodiment of the disclosure is not limited to the aforementioned devices, and the electronic device 100 may be implemented as an electronic device 100 equipped with two or more functions of the aforementioned devices. For example, according to a manipulation of a processor, a projector function of the electronic device 100 is turned off, and an illumination function or a speaker function is turned on, and the electronic device 100 may be utilized as a display device, an illumination device, or an audio device. Also, the electronic device 100 may include a microphone or a communication device, and may be utilized as an artificial intelligence (AI) speaker.

The main body 105 is a housing constituting the exterior, and it may support or protect the components of the electronic device 100 (e.g., the components illustrated in FIG. 2) that are arranged inside the main body 105. The shape of the main body 105 may have a structure close to a cylindrical shape as illustrated in FIG. 1. However, the shape of the main body 105 is not limited thereto, and according to the various embodiments of the disclosure, the main body 105 may be implemented as various geometrical shapes such as a column, a cone, a sphere, etc. having polygonal cross sections.

The size of the main body 105 may be a size that a user can grip or move with one hand, and the main body 105 may be implemented as a micro size so as to be easily carried, or it may be implemented as a size that can be held on a table or that can be coupled to an illumination device. Also, the material of the main body 105 may be implemented as a matt metallic or synthetic resin such that a user's fingerprint or dust does not smear it. Alternatively, the exterior of the main body 105 may include a slick glossy material.

In the main body 105, a friction area may be formed in a partial area of the exterior of the main body 105 such that a user can grip and move the main body 105. Alternatively, in the main body 105, a bent gripping part or a support 108 (described with respect to FIG. 3) that can be gripped by a user may be provided in at least a partial area.

The projection lens 110 is formed on one surface of the main body 105, and is formed to project a light that passed through a lens array to the outside of the main body 105. The projection lens 110 according to the various embodiments of the disclosure may be an optical lens which was low-dispersion coated for reducing chromatic aberration. Also, the projection lens 110 may be a convex lens or a condensing lens, and the projection lens 110 according to an embodiment of the disclosure may adjust the focus by adjusting locations of a plurality of sub lenses.

The head 103 may be provided to be coupled to one surface of the main body 105, and it can support and protect the projection lens 110. Also, the head 103 may be coupled to the main body 105 so as to be swiveled within a predetermined angle range based on one surface of the main body 105.

The head 103 may be automatically or manually swiveled by a user or the processor, and it may freely adjust a projection angle of the projection lens 110. Alternatively, the head 103 may include a neck that is coupled to the main body 105 and that extends from the main body 105. The head 103 may adjust a projection angle of the projection lens 110 as it is tipped or tilted.

The electronic device 100 may project a light or an image to a desired location by adjusting an emission angle of the projection lens 110 while adjusting the direction of the head 103 in a state where the location and the angle of the main body 105 are fixed. Also, the head 103 may include a handle that a user can grip after rotating in a desired direction.

On an outer circumferential surface of the main body 105, a plurality of openings 120 may be formed. Through the plurality of openings 120, audio output from an audio output part may be output to the outside of the main body 105 of the electronic device 100. The audio output part may include a speaker, and the speaker may be used for general uses such as reproduction of multimedia or reproduction of recording, output of a voice, etc.

The plurality of openings 120 according to an embodiment of the disclosure may perform a role of a vent that discharges air or heat inside the main body 105, and the electronic device 100 may discharge heat generated by the driving of the electronic device 100 to the outside through the plurality of openings 120.

The connector 130 may connect the electronic device 100 with an external device and transmit or receive electronic signals, or it may be supplied with power from the outside. The connector 130 according to an embodiment of the disclosure may be physically connected with an external device. The connector 130 may include an input/output interface, and it may connect communication with an external device or it may be supplied with power via wire or wirelessly. For example, the connector 130 may include a high definition multimedia interface (HDMI) connection terminal, a universal serial bus (USB) connection terminal, a secure digital (SD) card accommodating groove, an audio connection terminal, or a power consent. Alternatively, the connector 130 may include a Bluetooth, Wi-Fi, or wireless charge connection module that is connected with an external device wirelessly.

Also, the connector 130 may have a socket structure connected to an external illumination device, and it may be connected to a socket accommodating groove of an external illumination device and supplied with power. The size and specification of the connector 130 of a socket structure may be implemented in various ways in consideration of an accommodating structure of an external device that can be coupled. For example, according to the international standard E26, a diameter of a joining part of the connector 130 may be implemented as 26 mm, and in this case, the electronic device 100 may be coupled to an external illumination device such as a stand in place of a light bulb that is generally used. When coupled to a conventional socket located on a ceiling, the electronic device 100 has a structure of being projected from up to down, and in case the electronic device 100 does not rotate by socket-coupling, the screen cannot be rotated, either. Accordingly, in case power is supplied as the electronic device 100 is socket-coupled, in order that the electronic device 100 can rotate, the head 103 is swiveled on one surface of the main body 105 and adjusts an emission angle while the electronic device 100 is socket-coupled to a stand on a ceiling, and accordingly, the screen can be emitted to a desired location, or the screen can be rotated.

The connector 130 may include a coupling sensor, and the coupling sensor may sense whether the connector 130 and an external device are coupled, a coupled state, or a subject for coupling, etc. and transmit the information to the processor, and the processor may control the driving of the electronic device 100 based on the transmitted detection values.

The cover 107 may be coupled to or separated from the main body 105, and it may protect the connector 130 such that the connector 130 is not exposed to the outside at all times. The shape of the cover 107 may be a shape of being continued to the main body 105 as illustrated in FIG. 1. Alternatively, the shape may be implemented to correspond to the shape of the connector 130. Also, the cover 107 may support the electronic device 100, and the electronic device 100 may be coupled to the cover 107, and may be used while being coupled to or held on an external holder.

In the electronic device 100 according to the various embodiments of the disclosure, a battery may be provided inside the cover 107. The battery may include, for example, a primary cell that cannot be recharged, a secondary cell that can be recharged, or a fuel cell.

The electronic device 100 may include a camera module, and the camera module may photograph still images and moving images. According to an embodiment of the disclosure, the camera module may include one or more lenses, an image sensor, an image signal processor, or a flash.

The electronic device 100 may include a protection case such that the electronic device 100 can be easily carried while being protected. Alternatively, the electronic device 100 may include a stand that supports or fixes the main body 105, and a bracket that can be coupled to a wall surface or a partition.

Figure 2:
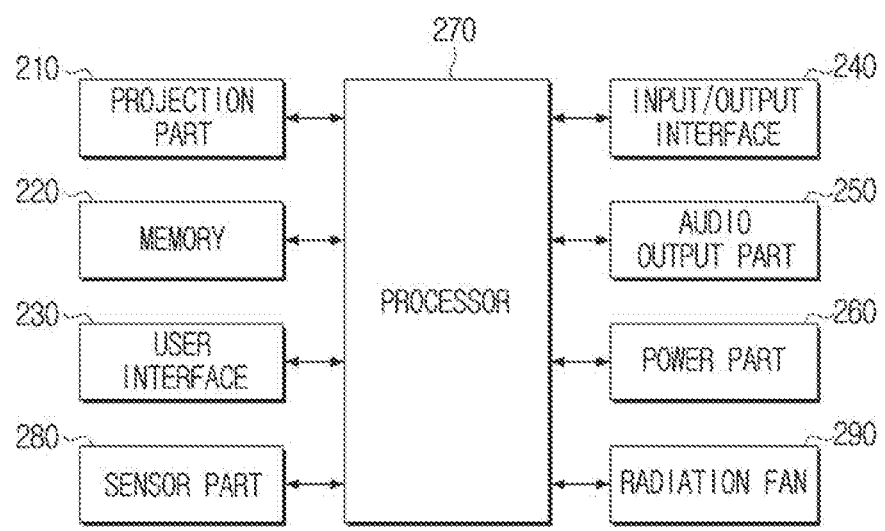
FIG. 2 is a block diagram illustrating a configuration of an electronic device according to an embodiment of the disclosure.

In addition, the electronic device 100 may be connected with various external devices by using a socket structure, and provide various functions. As an example, the electronic device 100 may be connected with an external camera device by using a socket structure. The electronic device 100 may provide an image stored in a connected camera device or an image that is currently being photographed by using a projection part. As another example, the electronic device 100 may be connected with a battery module by using a socket structure, and supplied with power. The electronic device 100 may be connected with an external device by using a socket structure, but this is merely an example, and the electronic device 100 may be connected with an external device by using another interface (e.g., a USB, etc.). FIG. 2 is a block diagram illustrating a configuration of an electronic device according to an embodiment of the disclosure. As illustrated in FIG. 2, the electronic device 100 may include a projection part 210, a memory 220, a user interface 230, an input/output interface 240, an audio output part 250, a power part 260, and a processor 270. The components illustrated in FIG. 2 are merely an example, and some components may be omitted, or new components may be added.

The projection part 210 is a component that projects an image to the outside. The projection part 210 according to an embodiment of the disclosure may be implemented in various projection methods (e.g., a cathode-ray tube (CRT) method, an LCD method, a DLP method, a laser method, etc.). As an example, the CRT method has the same principle as the principle of a CRT monitor. In the CRT method, an image is enlarged with a lens in front of a CRT, and the image is displayed on a screen. According to the number of CRTs, the CRT method is divided into a one-tube method and a three-tube method, and in the case of the three-tube method, it may be implemented while cathode-ray tubes of red, green, and blue are divided separately.

As another example, the LCD method is a method of displaying an image by making a light emitted from a light source pass through a liquid crystal. The LCD method is divided into a single-plate method and a three-plate method, and in the case of the three-plate method, a light emitted from a light source may be separated into red, green, and blue at a dichroic mirror (a mirror that reflects only a light in a specific color and makes the remaining lights pass through), and then pass through a liquid crystal, and then the light may be collected into one place again.

As still another example, the DLP method is a method of displaying an image by using a DMD chip. A projection part by the DLP method may include a light source, a color wheel, a DMD chip, a projection lens, etc. A light emitted from a light source may have a color as it passes through a rotating color wheel. The light that passed through the color wheel is input into a DMD chip. The DMD chip includes numerous micromirrors, and reflects the light input into the DMD chip. A projection lens may perform a role of enlarging the light reflected from the DMD chip to an image size.

As still another example, the laser method includes a diode pumped solid state (DPSS) laser and a galvanometer. As a laser outputting various colors, a laser where three DPSS lasers were installed for each of RGB colors, and then the optical axes were overlapped by using a special mirror is used. The galvanometer includes a mirror and a motor of a high output, and moves the mirror at a fast speed. For example, the galvanometer may rotate the mirror at 40 KHz/sec at the maximum. The galvanometer is mounted according to a scanning direction, and in general, a projector performs planar scanning, and thus the galvanometer may also be arranged by being divided into x and y axes.

The projection part 210 may include light sources in various types, and the light sources may be located inside the main body 105 and emit output lights. For example, the projection part 210 may include at least one light source among a lamp, a light emitting diode (LED), and a laser.

Also, the projection part 210 may output images in a 4:3 screen ratio, a 5:4 screen ratio, and a 16:9 wide screen ratio according to the use of the electronic device 100 or a user's setting, etc., and it may output images in various resolutions, such as WVGA(854*480), SVGA(800*600), XGA (1024*768), WXGA(1280*720), WXGA(1280*800), SXGA(1280*1024), UXGA(1600*1200), Full HD(1920*1080), etc. according to screen ratios.

The projection part 210 may perform various functions for adjusting an output image by control of the processor 270. For example, the projection part 210 may perform functions such as zoom, keystone, quick corner (4 corner) keystone, lens shift, etc.

Specifically, the projection part 210 may enlarge or reduce an image according to a distance (a projection distance) to the screen. That is, a zoom function may be performed according to a distance to the screen. The zoom function may include a hardware method of adjusting the size of the screen by moving a lens and a software method of adjusting the size of the screen by cropping an image, etc. When the zoom function is performed, adjustment of a focus of an image is needed. For example, methods of adjusting a focus include a manual focus method, an electric method, etc. The manual focus method may refer to a method of manually adjusting a focus, and the electric method may refer to a method where the projector automatically adjusts a focus by using a built-in motor when the zoom function is performed. When performing the zoom function, the projection part 210 may provide a digital zoom function through software, and it may also provide an optical zoom function of performing the zoom function by moving a lens through the driving part.

Also, the projection part 210 may perform a keystone function. When the height does not fit in the case of front surface scanning, the screen may be distorted in an upper direction or a lower direction. The keystone function means a function of correcting a distorted screen. For example, if distortion occurs in left and right directions of the screen, the screen may be corrected by using a horizontal keystone, and if distortion occurs in upper and lower directions, the screen may be corrected by using a vertical keystone. The quick corner (4 corner) keystone function is a function of correcting the screen in case the central area of the screen is normal, but the balance of the corner areas is not appropriate. The lens shift function is a function of moving the screen as it is in case the screen is outside the screen area.

The projection part 210 may automatically analyze the surrounding environment and the projection environment without a user input, and perform zoom/keystone/focus functions. Specifically, the projection part 210 may automatically provide zoom/keystone/focus functions based on the distance between the electronic device 100 and the screen, information on the space where the electronic device 100 is currently located, information on the light amount in the surroundings, etc. that were sensed through sensors (e.g., a depth camera, a distance sensor, an infrared sensor, an illumination sensor, etc.).

Also, the projection part 210 may provide an illumination function by using a light source. In particular, the projection part 210 may provide an illumination function by outputting a light source by using an LED. According to an embodiment of the disclosure, the projection part 210 may include an LED, and according to another embodiment of the disclosure, the electronic device may include a plurality of LEDs. The projection part 210 may output a light source by using a surface-emitting LED depending on implementation examples. The surface-emitting LED may refer to an LED that has a structure where an optical sheet is arranged on the upper side of the LED such that a light source is output while being evenly dispersed. Specifically, when a light source is output through the LED, the light source may be evenly dispersed through the optical sheet, and the light source dispersed through the optical sheet may be introduced into a display panel.

The projection part 210 may provide a dimming function for adjusting the strength of a light source to a user. Specifically, if a user input for adjusting the strength of a light source is received from a user through a user interface 240 (e.g., a touch display button or a dial), the projection part 210 may control the LED to output the strength of a light source corresponding to the received user input.

Also, the projection part 210 may provide the dimming function based on a content analyzed by the processor 270 without a user input. Specifically, the projection part 210 may control the LED to output the strength of a light source based on information on a content that is currently provided (e.g., the type of the content, the brightness of the content, etc.).

The projection part 210 may control a color temperature by control of the processor 270. The processor 270 may control a color temperature based on a content. Specifically, if it is identified that a content is going to be output, the processor 270 may acquire color information for each frame of the content which was determined to be output. Then, the processor 270 may control the color temperature based on the acquired color information for each frame. The processor 270 may acquire at least one main color of the frames based on the color information for each frame. Then, the processor 270 may adjust the color temperature based on the acquired at least one main color. For example, a color temperature that the processor 270 can adjust may be divided into a warm type or a cold type. Here, it is assumed that a frame to be output (referred to as an output frame hereinafter) includes a scene where fire occurred. The processor 270 may identify (or acquire) that the main color is red based on color information currently included in the output frame. Then, the processor 270 may identify a color temperature corresponding to the identified main color (red). The color temperature corresponding to red may be a warm type. The processor 270 may use an AI model for acquiring color information or a main color of a frame. According to an embodiment of the disclosure, the AI model may be stored in the electronic device 100 (e.g., the memory 230). According to another embodiment of the disclosure, the AI model may be stored in an external server that can communicate with the electronic device 100.

The electronic device 100 may be interlocked with an external device and control the illumination function. Specifically, the electronic device 100 may receive illumination information from an external device. The illumination information may include at least one of brightness information or color temperature information set in the external device. The external device may refer to a device connected to the same network as the electronic device 100 (e.g., an Internet of Things (IoT) device include in the same home/company network) or a device which is not connected to the same network as the electronic device 100, but which can communicate with the electronic device (e.g., a remote control server). For example, it is assumed that an external illumination device included in the same network as the electronic device 100 (e.g., an IoT device) is outputting a red illumination at the brightness of 50. The external illumination device (e.g., an IoT device) may directly or indirectly transmit illumination information (e.g., information indicating that a red illumination is being output at the brightness of 50) to the electronic device. The electronic device 100 may control the output of a light source based on the illumination information received from the external illumination device. For example, if the illumination information received from the external illumination device includes information that a red illumination is being output at the brightness of 50, the electronic device 100 may output the red illumination at the brightness of 50.

The electronic device 100 may control the illumination function based on bio-information. Specifically, the processor 270 may acquire bio-information of a user. The bio-information may include at least one of the body temperature, the heart rate, the blood pressure, the breath, or the electrocardiogram of the user. The bio-information may include various information other than the aforementioned information. As an example, the electronic device may include a sensor for measuring bio-information. The processor 270 may acquire bio-information of a user through the sensor, and control the output of a light source based on the acquired bio-information. As another example, the processor 270 may receive bio-information from an external device through the input/output interface 240. The external device may refer to a portable communication device of a user (e.g., a smartphone or a wearable device). The processor 270 may acquire bio-information of a user from the external device, and control the output of a light source based on the acquired bio-information. Depending on implementation examples, the electronic device may identify whether a user is sleeping, and if it is identified that a user is sleeping (or preparing to sleep), the processor 270 may control the output of a light source based on the bio-information of the user.

The memory 220 may store at least one instruction regarding the electronic device 100. Also, in the memory 220, an operating system (OS) for driving the electronic device 100 may be stored. In addition, in the memory 220, various software programs or applications for the electronic device 100 to operate according to the various embodiments of the disclosure may be stored. Further, the memory 220 may include a semiconductor memory such as a flash memory or a magnetic storage medium such as a hard disk.

Specifically, in the memory 220, various kinds of software modules for the electronic device 100 to operate according to the various embodiments of the disclosure may be stored, and the processor 270 may control the operations of the electronic device 100 by executing the various kinds of software modules stored in the memory 220. That is, the memory 220 may be accessed by the processor 270, and reading/recording/correcting/deleting/updating, etc. of data by the processor 270 may be performed.

In the disclosure, the term memory 220 may be used as meaning including the memory 220, a read-only memory (ROM) and a random access memory (RAM) inside the processor 270, or a memory card installed on the electronic device 100 (e.g., a micro SD card, a memory stick).

The user interface 230 may include input devices in various types. For example, the user interface 230 may include a physical button. The physical button may include a function key, direction keys (e.g., four direction keys), or a dial button. According to an embodiment of the disclosure, the physical button may be implemented as a plurality of keys. According to another embodiment of the disclosure, the physical button may be implemented as one key. Here, in case the physical button is implemented as one key, the electronic device 100 may receive a user input by which one key is pushed for equal to or longer than a threshold time. If a user input by which one key is pushed for equal to or longer than a threshold time is received, the processor 270 may perform a function corresponding to the user input. For example, the processor 270 may provide the illumination function based on the user input.

Also, the user interface 230 may receive a user input by using a non-contact method. In the case of receiving a user input through a contact method, physical force should be transmitted to the electronic device. Accordingly, a method for controlling the electronic device regardless of physical force may be needed. Specifically, the user interface 230 may receive a user gesture, and perform an operation corresponding to the received user gesture. The user interface 230 may receive a gesture of a user through the sensor part 280.

In addition, the user interface 230 may receive a user input by using a touch method. For example, the user interface 230 may receive a user input through a touch sensor. According to an embodiment of the disclosure, a touch method may be implemented as a non-contact method. For example, the touch sensor may determine whether a user's body approached within a threshold distance. The touch sensor may identify a user input even when a user does not contact the touch sensor. According to a different implementation example, the touch sensor may identify a user input by which a user contacts the touch sensor.

The electronic device 100 may receive user inputs by various methods other than the aforementioned user interface. As an example, the electronic device 100 may receive a user input through an external remote control device. The external remote control device may be a remote control device corresponding to the electronic device 100 (e.g., a control device dedicated to the electronic device) or a portable communication device of a user (e.g., a smartphone or a wearable device). Here, in the portable communication device of a user, an application for controlling the electronic device may be stored. The portable communication device may acquire a user input through the stored application, and transmit the acquired user input to the electronic device 100. The electronic device 100 may receive the user input from the portable communication device, and perform an operation corresponding to the user's control command.

The electronic device 100 may receive a user input by using voice recognition. According to an embodiment of the disclosure, the electronic device 100 may receive a user voice through the microphone included in the electronic device. According to another embodiment of the disclosure, the electronic device 100 may receive a user voice from the microphone or an external device. Specifically, an external device may acquire a user voice through a microphone of the external device, and transmit the acquired user voice to the electronic device 100. The user voice transmitted from the external device may be audio data or digital data converted from audio data (e.g., audio data converted to a frequency domain, etc.). The electronic device 100 may perform an operation corresponding to the received user voice. Specifically, the electronic device 100 may receive audio data corresponding to the user voice through the microphone. Then, the electronic device 100 may convert the received audio data into digital data. Then, the electronic device 100 may convert the converted digital data into text data by using a speech to text (STT) function. According to an embodiment of the disclosure, the STT function may be directly performed at the electronic device 100, and according to another embodiment of the disclosure, the STT function may be performed at an external server. The electronic device 100 may transmit digital data to the external server. The external server may convert the digital data into text data, and acquire control command data based on the converted text. The external server may transmit the control command data (the text data may also be included) to the electronic device 100. The electronic device 100 may perform an operation corresponding to the user voice based on the acquired control command data.

The electronic device 100 may provide a voice recognition function by using one assistance (or an AI agent, such as Bixby™, etc.), but this is merely an example, and the electronic device 100 may provide a voice recognition function through a plurality of assistances. The electronic device 100 may provide the voice recognition function by selecting one of the plurality of assistances based on a trigger word corresponding to the assistance or a specific key that exists on the remote control.

The electronic device 100 may receive a user input by using a screen interaction. The screen interaction may refer to a function of the electronic device of identifying whether a predetermined event occurs through an image projected on a screen (or a projection surface), and acquiring a user input based on the predetermined event. The predetermined event may refer to an event where a predetermined object is identified in a specific location (e.g., a location where a user interface (UI) for receiving a user input was projected). The predetermined object may include at least one of a body part of a user (e.g., a finger), a pointer, or a laser point. If the predetermined object is identified in a location corresponding to the projected UI, the electronic device 100 may identify that a user input selecting the projected UI was received. For example, the electronic device 100 may project a guide image so that the UI is displayed on the screen. Then, the electronic device 100 may identify whether the user selects the projected UI. Specifically, if the predetermined event is identified in the location of the projected UI, the electronic device 100 may identify that the user selected the projected UI. The projected UI may include at least one item. The electronic device 100 may perform spatial analysis for identifying whether the predetermined event is in the location of the projected UI. The electronic device 100 may perform spatial analysis through a component of the sensor part 280 (e.g., an image sensor, an infrared sensor, a depth camera, a distance sensor, etc.). By performing spatial analysis, the electronic device 100 may identify whether the predetermined event occurs in the specific location (the location where the UI was projected). Then, if it is identified that the predetermined event occurs in the specific location (the location where the UI was projected), the electronic device 100 may identify that a user input for selecting the UI corresponding to the specific location was received.

The input/output interface 240 is a component for inputting or outputting at least one of an audio signal or an image signal. The input/output interface 240 may receive input of at least one of an audio signal or an image signal from an external device, and output a control command to the external device.

The input/output interface 240 according to an embodiment of the disclosure may be implemented as a wired input/output interface of at least one of an HDMI, a mobile high-definition link (MHL), a USB, a USB C-type, a display port (DP), a Thunderbolt, a video graphics array (VGA) port, an RGB port, a Dsubminiature (D-SUB), or a digital visual interface (DVI). According to an embodiment of the disclosure, the wired input/output interface may be implemented as an interface inputting or outputting only audio signals and an interface inputting or outputting only image signals, or implemented as one interface inputting or outputting both audio signals and image signals.

Also, the electronic device 100 may receive data through the wired input/output interface, but this is merely an example, and the electronic device 100 may be supplied with power through the wired input/output interface. For example, the electronic device 100 may be supplied with power from an external battery through a USB C-type, or supplied with power from a consent through a power adapter. As another example, the electronic device may be supplied with power from an external device (e.g., a laptop computer or a monitor, etc.) through a DP.

The input/output interface 240 according to an embodiment of the disclosure may be implemented as a wireless input/output interface that performs communication by at least one communication method among the communication methods of Wi-Fi, Wi-Fi Direct, Bluetooth, Zigbee, 3rd Generation (3G), 3rd Generation Partnership Project (3GPP), and Long Term Evolution (LTE). Depending on implementation examples, the wireless input/output interface may be implemented as an interface inputting or outputting only audio signals and an interface inputting or outputting only image signals, or implemented as one interface inputting or outputting both audio signals and image signals.

Also, the electronic device 100 may be implemented such that an audio signal is input through a wired input/output interface, and an image signal is input through a wireless input/output interface. Alternatively, the electronic device 100 may be implemented such that an audio signal is input through a wireless input/output interface, and an image signal is input through a wired input/output interface.

The audio output part 250 is a component that outputs audio signals. In particular, the audio output part 250 may include an audio output mixer, an audio signal processor, and an audio output module. The audio output mixer may mix a plurality of audio signals to be output as at least one audio signal. For example, the audio output mixer may mix an analog audio signal and another analog audio signal (e.g.: an analog audio signal received from the outside) as at least one analog audio signal. The audio output module may include a speaker or an output terminal. According to an embodiment of the disclosure, the audio output module may include a plurality of speakers, and in this case, the audio output module may be arranged inside the main body, and audio that is emitted while covering at least a part of a vibration plate of the audio output module may be transmitted to the outside of the main body after passing through a waveguide. The audio output module may include a plurality of audio output units, and the plurality of audio output units may be symmetrically arranged on the exterior of the main body, and accordingly, audio may be emitted to all directions, i.e., all directions in 360 degrees.

The power part 260 may be supplied with power from the outside and supply the power to various components of the electronic device 100. The power part 260 according to an embodiment of the disclosure may be supplied with power through various methods. As an example, the power part 260 may be supplied with power by using the connector 130 as illustrated in FIG. 1. Also, the power part 260 may be supplied with power by using a direct current (DC) power code of 220V. However, the disclosure is not limited thereto, and the electronic device may be supplied with power by using a USB power code or supplied with power by using a wireless charging method.

Also, the power part 260 may be supplied with power by using an internal battery or an external battery. The power part 260 according to an embodiment of the disclosure may be supplied with power through an internal battery. As an example, the power part 260 may charge power of the internal battery by using at least one of a DC power code of 220V, a USB power code, or a USB C-type power code, and may be supplied with power through the charged internal battery. Also, the power part 260 according to an embodiment of the disclosure may be supplied with power through an external battery. As an example, if connection between the electronic device and an external battery is performed through various wired communication methods such as a USB power code, a USB C-type power code, a socket groove, etc., the power part 260 may be supplied with power through the external battery. That is, the power part 260 may be directly supplied with power from an external battery, or charge an internal battery through an external battery, and supplied with power from the charged internal battery.

The power part 260 according to the disclosure may be supplied with power by using at least one of the aforementioned plurality of power supplying methods.

Regarding power consumption, the electronic device 100 may have power consumption of equal to or smaller than a predetermined value (e.g., 43 W) due to a form of a socket or other standards, etc.

The sensor part 280 may recognize the driving environment of the electronic device 100, such as the brightness of the surroundings, the temperature and the humidity, and an operation of another illumination, or a user's location, gesture, and operation, and transmit the detection result to the processor 270. The sensor part 280 may include various kinds of sensors, and it may be implemented as a switch sensor, an image sensor, and an infrared sensor according to the operating method. The sensor part 280 may include at least one of sensors 182, 184, 189, 194 that sense whether the cover is coupled and/or the coupled state, and operations of these sensors will be described in detail in FIG. 11A below.

The radiation fan 290 may prevent driving of the components inside the main body 105, e.g., overheating by light emission of a light source, and adjust the temperature inside the main body 105 by driving of the electronic device 100. Also, due to the increase of the temperature inside the main body 105, differences in the temperatures and the humidity may occur between the inside and the outside, and dew condensation may be formed, and the lifespan of the internal components may decrease, and the driving efficiency may be reduced. Thus, the processor 270 may drive the radiation fan 290 based on the driving of the electronic device 100 and/or the sensing result of the sensor part 280, and thereby adjust the temperature and the humidity inside the main body 105.

The electronic device 100 according to an embodiment of the disclosure may provide various smart functions.

Specifically, the electronic device 100 may be connected with a portable terminal device for controlling the electronic device 100, and the screen output at the electronic device 100 may be controlled through a user input that is input at the portable terminal device. As an example, the portable terminal device may be implemented as a smartphone including a touch display, and the electronic device 100 may receive screen data provided at the portable terminal device from the portable terminal device and output the data, and the screen output at the electronic device 100 may be controlled according to a user input that is input at the portable terminal device.

The electronic device 100 may perform connection with the portable terminal device through various communication methods such as Miracast, Airplay, wireless DeX, a remote personal computer (PC) method, etc., and share contents or music provided at the portable terminal device.

Also, connection between the portable terminal device and the electronic device 100 may be performed by various connection methods. As an example, the electronic device 100 may be searched at the portable terminal device and wireless connection may be performed, or the portable terminal device may be searched at the electronic device 100 and wireless connection may be performed. Then, the electronic device 100 may output contents provided at the portable terminal device.

As an example, in a state where a specific content or music is being output at the portable terminal device, if the portable terminal device is located around the electronic device, and then a predetermined gesture (e.g., a motion tap view) is detected through a display of the portable terminal device, the electronic device 100 may output the content or music that is being output at the portable terminal device.

As an example, in a state where a specific content or music is being output at the portable terminal device, if the portable terminal device becomes close to the electronic device 100 by equal to or smaller than a predetermined distance (e.g., a non-contact tap view), or the portable terminal device contacts the electronic device 100 two times at a short interval (e.g., a contact tap view), the electronic device 100 may output the content or music that is being output at the portable terminal device.

In the aforementioned embodiment, it was described that the same screen as the screen that is being provided at the portable terminal device is provided at the electronic device 100, but the disclosure is not limited thereto. That is, if connection between the portable terminal device and the electronic device 100 is constructed, a first screen provided at the portable terminal device may be output at the portable terminal device, and a second screen provided at the portable terminal device that is different from the first screen may be output at the electronic device 100. As an example, the first screen may be a screen provided by a first application installed on the portable terminal device, and the second screen may be a screen provided by a second application installed on the portable terminal device. As an example, the first screen and the second screen may be different screens from each other that are provided by one application installed on the portable terminal device. Also, as an example, the first screen may be a screen including a UI in a remote control form for controlling the second screen.

The electronic device 100 according to the disclosure may output a standby screen. As an example, in case connection between the electronic device 100 and an external device was not performed or in case there is no input received from an external device during a predetermined time, the electronic device 100 may output a standby screen. Conditions for the electronic device 100 to output a standby screen are not limited to the aforementioned example, and a standby screen may be output by various conditions.

The electronic device 100 may output a standby screen in the form of a blue screen, but the disclosure is not limited thereto. As an example, the electronic device 100 may extract only a shape of a specific object from data received from an external device and acquire an atypical object, and output a standby screen including the acquired atypical object.

Figure 3:
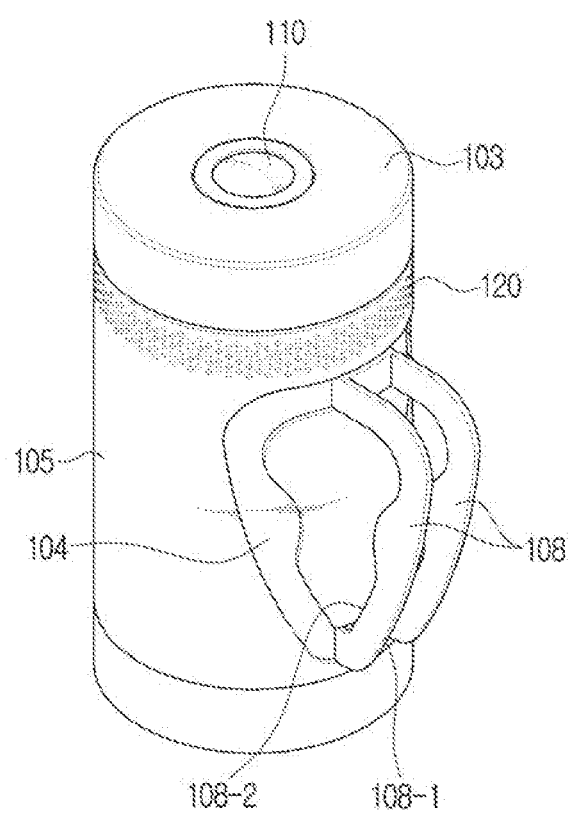
FIG. 3 is an enlarged perspective view of a part of an electronic device according to an embodiment of the disclosure.

FIG. 3 is a perspective view illustrating the exterior of the electronic device 100 according to an embodiment of the disclosure. Referring to FIG. 3, the electronic device 100 may include a support (or, it may be referred to as "a handle") 108.

The support 108 according to the various embodiments of the disclosure may be a handle or a ring that is provided for a user to grip or move the electronic device 100. Alternatively, the support 108 may be a stand that supports the main body 105 while the main body 105 is laid down in the direction of the side surface.

The support 108 may be connected in a hinge structure such that it is coupled to or separated from the outer circumferential surface of the main body 105 as illustrated in FIG. 3, and it may be selectively separated from or fixed to the outer circumferential surface of the main body 105 according to a user's need. The number, shape, or arrangement structure of the support 108 may be implemented in various ways without restriction. The support 108 may be housed inside the main body 105, and it may be taken out and used by a user depending on needs. Alternatively, the support 108 may be implemented as a separate accessory, and it may be attached to or detached from the electronic device 100.

The support 108 may include a first support surface 108-1 and a second support surface 108-2. The first support surface 108-1 may be a surface that faces the outer direction of the main body 105 while the support 108 is separated from the outer circumferential surface of the main body 105, and the second support surface 108-2 may be a surface that faces the inner direction of the main body 105 while the support 108 is separated from the outer circumferential surface of the main body 105.

The first support surface 108-1 may proceed toward the upper part of the main body 105 from the lower part of the main body 105 and get far from the main body 105, and the first support surface 108-1 may have a shape that is flat or uniformly curved. In case the electronic device 100 is held such that the outer side surface of the main body 105 contacts the bottom surface, that is, in case the electronic device 100 is arranged such that the projection lens 110 is toward the front surface direction, the first support surface 108-1 may support the main body 105. In an embodiment including two or more supports 108, the emission angle of the head 103 and the projection lens 110 may be adjusted by adjusting the interval or the hinge opening angle of the two supports 108.

The second support surface 108-2 is a surface that contacts a user or an external holding structure when the support 108 is supported by the user or the external holding structure, and it may have a shape corresponding to the gripping structure of the user's hand or the external holding structure such that the electronic device 100 does not slip in case the electronic device 100 is supported or moved. The user may make the projection lens 110 face toward the front surface direction, and fix the head 103 and hold the support 108, and move the electronic device 100, and use the electronic device 100 like a flashlight.

The support groove 104 is a groove structure that is provided on the main body 105 and where the support 108 can be accommodated when it is not used, and as illustrated in FIG. 3, the support groove 104 may be implemented as a groove structure corresponding to the shape of the support 108 on the outer circumferential surface of the main body 105. Through the support groove 104, the support 108 may be kept on the outer circumferential surface of the main body 105 when the support 108 is not used, and the outer circumferential surface of the main body 105 may be maintained to be slick.

Alternatively, in a situation where the support 108 is kept inside the main body 105 and the support 108 is needed, the electronic device 100 may have a structure where the support 108 is taken out to the outside of the main body 105. In this case, the support groove 104 may be a structure that is led into the inside of the main body 105 so as to accommodate the support 108, and the second support surface 108-2 may include a door that adheres to the outer circumferential surface of the main body 105 or opens or closes the separate support groove 104.

The electronic device 100 may include various kinds of accessories that are helpful in using or keeping the electronic device 100. For example, the electronic device 100 may include a protection case such that the electronic device 100 can be easily carried while being protected. Alternatively, the electronic device 100 may include a tripod that supports or fixes the main body 105, and a bracket that can be coupled to an outer surface and fix the electronic device 100.

Figure 4:
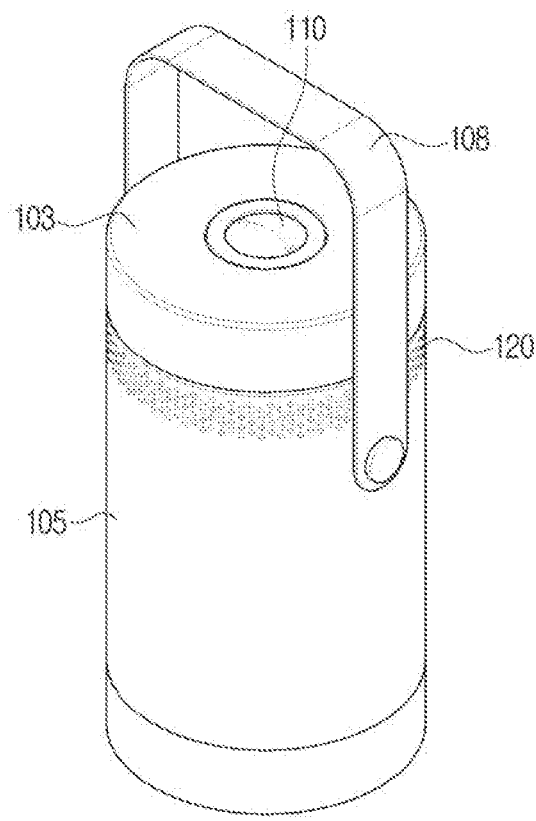
FIG. 4 is a cross-sectional view illustrating an output light of an electronic device according to an embodiment of the disclosure.

FIG. 4 is a perspective view illustrating the exterior of the electronic device 100 according to an embodiment. Referring to FIG. 4, the electronic device 100 may include a support (or, it may be referred to as "a handle") 108.

The support 108 according to the various embodiments of the disclosure may be a handle or a ring that is provided for a user to grip or move the electronic device 100. Alternatively, the support 108 may be a stand that supports the main body 105 so that the main body 105 can be toward a random angle while the main body 105 is laid down in the direction of the side surface.

As illustrated in FIG. 4, the support 108 may be connected with the main body 105 at a predetermined point (e.g., a ⅔-¾ point) of the main body 105. When the support 108 is rotated in the direction of the main body, the main body 105 may be supported such that the main body 105 can be toward a random angle while the main body 105 is laid down in the direction of the side surface.

The support 108 illustrated in FIG. 3 and FIG. 4 is merely an example, and the electronic device 100 may include a support in various locations or forms.

Figure 5:
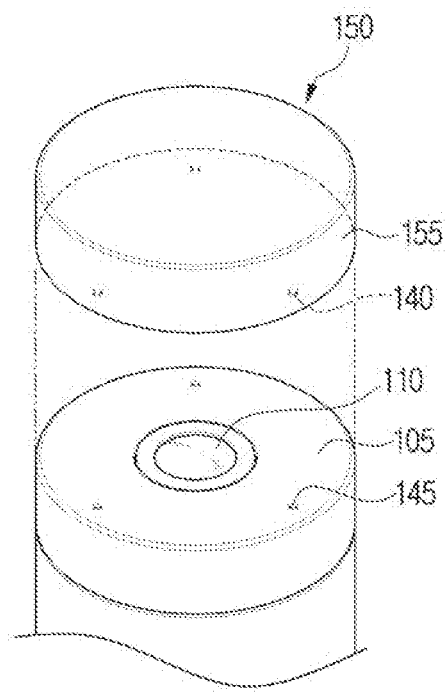
FIG. 5 is an enlarged perspective view of a part of an electronic device according to an embodiment of the disclosure.

FIG. 5 is an enlarged perspective view of a part of the electronic device 100 according to an embodiment of the disclosure.

Referring to FIG. 5, the electronic device 100 according to the disclosure may include a cover 150.

The cover 150 may be located so as to be selectively adjacent to or distanced from the projection lens 110, and open or close the projection lens 110. Specifically, the cover 150 may be located such that it is close to the projection lens 110 and at least a partial area is folded or distanced from the projection lens 110. Alternatively, the cover 150 may be located such that it is distanced from the projection lens 110 within a predetermined interval range and gets far from or close to the projection lens 110. The cover 150 may be implemented in the form of a lid or a cap.

The cover 150 may be selectively coupled to the main body 105 or the case 170 of the main body 105. When the cover 150 is coupled to the main body 105, it may become close to the projection lens 110, and when the cover 150 is separated from the main body 105, it may become distant from the projection lens 110.

The coupling manner of the cover 150 and the main body 105 may be implemented in various ways. The cover 150 may include a plurality of projections 140 that are formed on a surface opposing the projection lens 110 (e.g., a lower surface of a diffusing layer 155), and the main body 105 may include a plurality of projection grooves 145 that are formed such that each of the plurality of projections 140 can be introduced into them. Also, the plurality of projections 140 and the plurality of projection grooves 145 may be implemented as magnetic bodies between which mutual magnetic attraction operates.

If the cover 150 is closely coupled to the main body 105, or if the cover 150 and the projection lens 110 are arranged to be close to each other, the cover 150 may receive an output light emitted from the projection lens 110 and diffuse the light, and emit the light to the outside of the cover 150. There are no restrictions on the diffusing directions and the emitting directions of the cover 150, and an emitted light may be diffused to all areas without directivity. Alternatively, an emitted light may be diffused while being guided in a predetermined direction.

The cover 150 according to an embodiment of the disclosure may include a single layer structure of the diffusing layer 155, and it may diffuse and emit an output light emitted from the projection lens 110. In this case, when the cover 150 is coupled, the light emitted from the projection lens 110 is diffused through the cover 150, and the electronic device 100 may illuminate the light on a wide area, and perform a function of an illumination.

The cover 150 according to the various embodiments of the disclosure may include a reflecting layer 151 (as described in FIG. 8) that is coupled to at least a partial area of the outer surface of the diffusing layer 155, or include a reflecting crystal or reflectors 152, 154 (described in FIG. 10A-FIG. 10D) provided inside the diffusing layer 155.

If the cover 150 is located to be adjacent to the projection lens 110, a cover sensor which is one component of the sensor part 280 (e.g., an image sensor, an infrared sensor, a depth camera, or a distance sensor (refer to FIG. 11A to FIG. 11C) that senses whether the cover 150 is adjacent or coupled, and provides the sensing result to the processor 270, and the processor 270 may drive the electronic device 100 in an illumination mode based on whether the cover 150 is adjacent or coupled. Such a driving will be described in detail with reference to the method of controlling the electronic device 100 in FIG. 12.

The cover 150 according to various embodiments of the disclosure may be coupled to the main body 105 such that it is adjacent to the projection lens 110 or distanced from the projection lens 110 by at least one predetermined interval, and there may be a plurality of coupling steps in consideration of the distance between the cover 150 and the projection lens 110. The coupling and controlling methods of the cover 150 in various ways will be described in detail in FIG. 11A below.

Figure 6A:
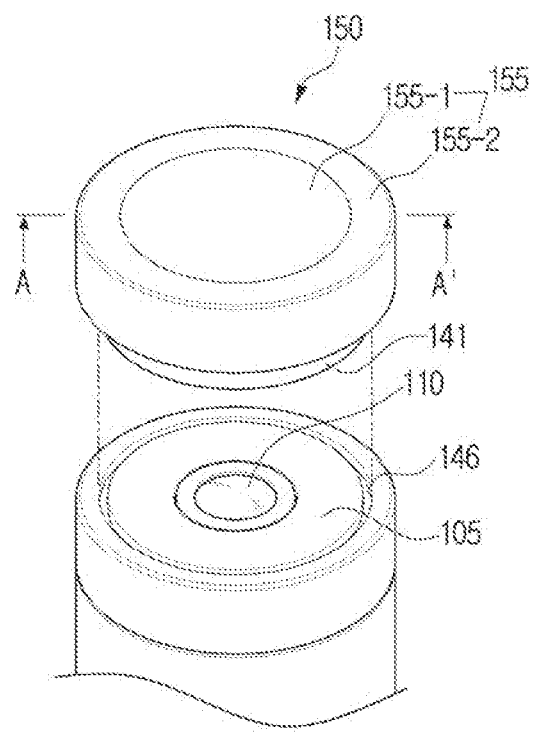
FIG. 6A is an enlarged perspective view of a part of an electronic device according to an embodiment of the disclosure.

FIG. 6A is an enlarged perspective view of a part of the electronic device 100 according to an embodiment of the disclosure.

Referring to FIG. 6A, the cover 150 according to an embodiment may include an elastic area 155-1, a supporting area 155-2, and a coupling column 141.

Figure 6B:
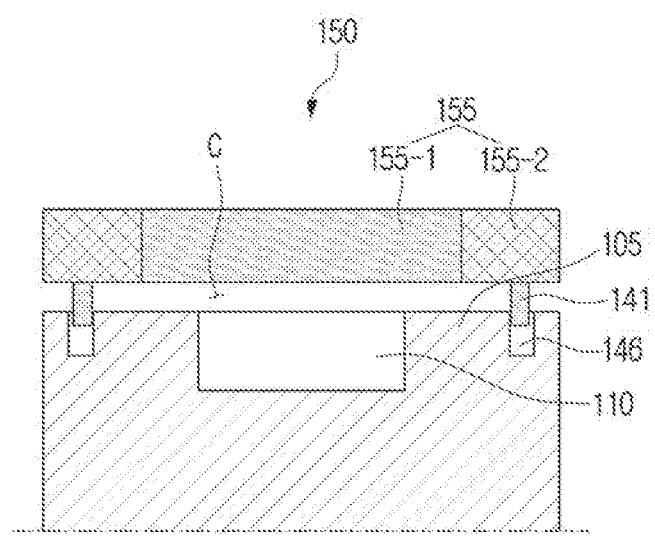
FIG. 6B is a cross-sectional view of the electronic device in FIG. 6A along the A-A' direction according to an embodiment of the disclosure.

The elastic area 155-1 is at least a partial area of the surface of the cover 150 facing the projection lens 110, and it may include an elastic material. As illustrated in FIGS. 6A and 6B, the elastic area 155-1 may be an area that continues from the upper surface of the cover 150 to the lower surface, and that is exposed to the outer circumferential surface of the cover 150. The elastic area 155-1 according to an embodiment of the disclosure may be an area that continues from the center of the cover 150 to the surface facing the projection lens 110, and the entire area of the cover 150 according to an embodiment of the disclosure may include the elastic area 155-1.

The other area excluding the elastic area 155-1 may include the supporting area 155-2. The supporting area 155-2 may support the elastic area 155-1, and form the exterior of the cover 150. The supporting area 155-2 may include an elastic material, and in this case, the elastic modulus of the material constituting the supporting area 155-2 may be different from the elastic modulus of the material constituting the elastic area 155-1.

The coupling column 141 may be formed to extend to the lower end direction of the cover 150, and the coupling column 141 according to an embodiment of the disclosure may be formed in the lower part of the diffusing layer 155. The coupling column 141 may include an elastic material, and it may include silicon or a synthetic resin having flexibility. The structure and characteristics of the coupling column 141 described in FIG. 6A and FIG. 6B can be applied in the same manner to the coupling columns in various structures 142, 143, 180 that will be described below.

The coupling column 141 according to the various embodiments of the disclosure may have a cylindrical shape of which center area is empty and which includes a continuous body. In this case, when the cover 150 is coupled to the main body 105, the projection lens 110 may be located in the center area of the coupling column 141. The coupling column 140 may include an elastic material, and have flexibility.

The main body 105 may have a shape corresponding to the shape of the coupling column 141, and include an accommodating groove 146 that can accommodate the coupling column 141. The accommodating groove 146 according to an embodiment of the disclosure may have a groove structure which surrounds the projection lens 110 at the head of the main body 105, and which is caved in toward the inside.

FIG. 6B is a cross-sectional view of the electronic device 100 in FIG. 6A along the A-A' direction according to an embodiment.

With reference to FIG. 6B, the coupling structure of the cover 150 and the projection lens 110 in an embodiment according to FIG. 6A will be described.

If the cover 150 and the projection lens 110 become adjacent to each other, at least a part of the coupling column 141 of the cover 150 may be introduced into the accommodating groove 146. In this case, the inner side surface of the coupling column 141 may adhere to the accommodating groove 146, and between the projection lens 110 and the cover 150, a sealed space C may be temporarily formed.

The cover 150 may become more adjacent to the projection lens 110 by a user or an external force, and accordingly, the pressure of the sealed space C between the projection lens 110 and the cover 150 may become high, and the air of the sealed space C may push out the coupling column 141 having flexibility and may be emitted to the outside.

When an external force applied to the cover 150 is removed, the sealed space C between the cover 150 and the projection lens 110 may be in a state of low air pressure, and the cover 150 may be made to adhere in the direction of the main body 105. Alternatively, if a force pulling the cover 150 in an opposition direction to the projection lens 110 is applied to the cover 150, the air pressure between the cover 150 and the sealed space C may decrease, and a force for detaching the cover 150 may increase.

The cover 150 according to an embodiment of the disclosure may include an elastic area 155-1, and when the cover 150 and the projection lens 110 become adjacent to each other, the elastic area 155-1 may push air to the outside of the space between the cover 150 and the projection lens 110. Specifically, when the sealed space C between the cover 150 and the projection lens 110 is formed, the elastic area 155-1 may be deformed by the internal air pressure, and through this, the force for detaching the cover 150 may be further increased, and as a result, detachment of the cover 150 can be effectively prevented.

According to an embodiment of the disclosure, in case the elastic area 155-1 continues from the upper part of the cover 150 to the lower part, if a user pushes the elastic area 155-1 of the cover 150, the pressure of the sealed space C between the cover 150 and the projection lens 110 increases and the air escapes to the outside, and accordingly, the pressure of the sealed space C can be reduced more easily.

Thus, as the coupling column 141 is introduced into the accommodating groove 146, the cover 150 may push the air inside the sealed space C to the outside, and make the inside of the sealed space C be in a state of low air pressure or a vacuum state. As a result, a state of low air pressure or a vacuum state is formed between the cover 150 and the projection lens 110, and they become closely coupled to each other, and accordingly, slipping or detachment of the cover 150 from the main body 150 can be prevented.

Figure 7A:
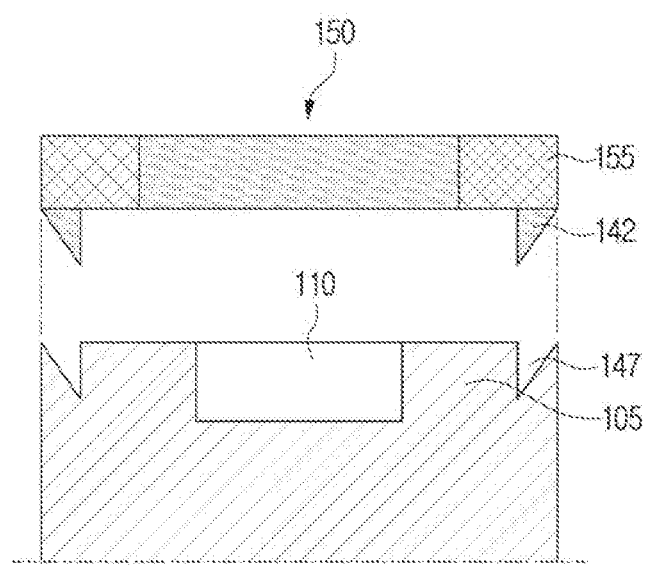
FIG. 7A is a cross-sectional view of a part of an electronic device according to an embodiment of the disclosure.

FIG. 7A is an enlarged perspective view of a part of the electronic device 100 according to an embodiment of the disclosure.

Referring to FIG. 7A, the coupling column 142 and the accommodating groove 147 may have various shapes.

The coupling column 142 may have a shape which extends from the lower surface of the diffusing layer 155 of the cover 150 to the lower part and of which cross-sectional area gradually decreases, and in this case, the accommodating groove 147 may proceed from the upper part to the lower part correspondingly to the shape of the coupling column 142, and its cross-sectional area may gradually decrease.

The coupling column 142 may include an elastic material, and in this case, the lower side of the coupling column 142 is formed to be relatively thin, and thus the lower side of the coupling column 142 may be deformed relatively easily.

When the cover 150 and the projection lens 110 become adjacent to each other and the sealed space C is formed, as the lower side of the coupling column 142 is deformed relatively easily, the air of the sealed space C can be discharged to the outside easily. Also, when the cover 150 and the projection lens 110 adhere to each other, as the upper side of the coupling column 142 is not deformed relatively easily, it is difficult to introduce air into the sealed space C, and a force for detaching the cover 150 may be further increased, and accordingly, detachment of the cover 150 can be effectively prevented.

In an embodiment where the cover 150 has the coupling column 142 in FIG. 6B, air can come in and go out through the accommodating groove 147 easily if the accommodating groove 147 has a bigger cross-sectional area than the cross-sectional area of the coupling column 142. However, in an embodiment where the cover 150 has the coupling column 142 in FIG. 7A, the shapes of the coupling column 142 and the accommodating groove 147 may be formed to be relatively more similar, and a gap between the accommodating groove 147 and the coupling column 142 can be minimized.

Figure 7B:
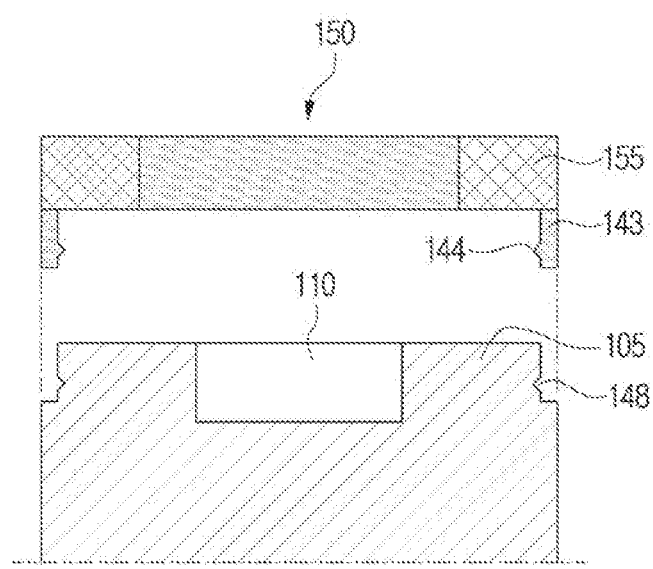
FIG. 7B is a cross-sectional view of a part of an electronic device according to an embodiment of the disclosure.

FIG. 7B is a cross-sectional view of a part of the electronic device 100 according to an embodiment of the disclosure.

Referring to FIG. 7B, the coupling column 143 and the accommodating groove 148 may have various shapes.

The coupling column 143 may include a ring-shaped coupling part 148 that projects in the direction of the inner side surface and continues, and in this case, the accommodating groove 148 may have a groove structure that is caved in toward the direction of the inner side surface correspondingly to the shapes of the coupling column 143 and the coupling part 148, and it may accommodate the coupling part 148.

The coupling column 143 may include an elastic material, and in this case, when the cover 150 and the projection lens 110 become adjacent to each other and the sealed space C is formed, the coupling column 143 may be deformed as it is pushed to the outer side by the coupling part 148 and distanced from the main body 105, and the air of the sealed space C may push out the coupling part 148 and may be discharged to the outside. Also, when the coupling part 148 is seated on the accommodating groove 148 and the cover 150 and the projection lens 110 become adjacent to each other, the coupling column 143 may closely contact the outer circumferential surface on the upper side of the main body 105. Thus, when the coupling part 148 is seated on the accommodating groove 148, the coupling column 143 and the main body 105 adhere to each other and it becomes difficult to introduce air into the sealed space C, and a force for detaching the cover 150 may be further increased, and accordingly, detachment of the cover 150 can be effectively prevented.

Figure 8:
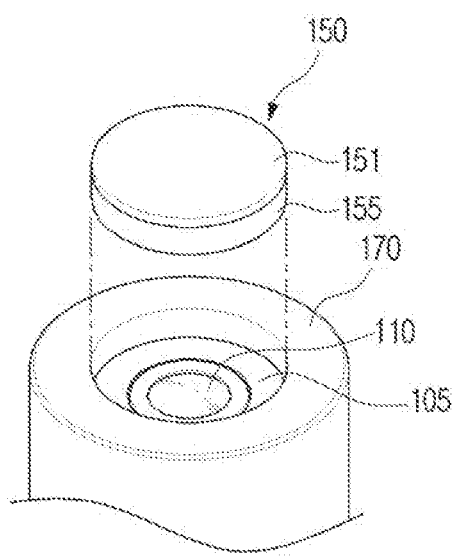
FIG. 8 is an enlarged perspective view of a part of an electronic device according to an embodiment of the disclosure.

FIG. 8 is an enlarged perspective view of a part of the electronic device 100 according to an embodiment of the disclosure.

Referring to FIG. 8, the cover 150 according to the disclosure may include a reflecting layer 151 and a diffusing layer 155, and the electronic device 100 may include a case 170.

In the various embodiments of the disclosure, the cover 150 may include a reflecting layer 151 and a diffusing layer 155, and the cover 150 may induce an output light emitted from the projection lens 110 without directivity or to a predetermined direction and diffuse the light.

The reflecting layer 151 may reflect an output light emitted from the projection lens 110, and the diffusing layer 155 may diffuse an output light emitted from the projection lens 110. The reflecting layer 151 and the diffusing layer 155 are names for distinguishing their respective roles and describing them easily, and in actual implementation, each component may not be implemented as a layer structure, but may be implemented in various ways such as a reflecting area and a diffusing area, a reflecting surface and a diffusing surface, a reflecting column and a diffusing column, etc.

As illustrated in FIG. 8, in the upper part of the cover 150 according to an embodiment of the disclosure, the reflecting layer 151 may be arranged, and the diffusing layer 155 may be arranged on the lower surface of the reflecting layer 151. Alternatively, the reflecting layer 151 may be formed on the upper surface of the diffusing layer 155, and reflect an output light that is transmitted by passing through the diffusing layer 155.

At least some areas of the reflecting layer 151 and the diffusing layer 155 may be located on the same plane, and for example, the diffusing layer 155 may extend inside an output hole 153 (refer to FIG. 10C) formed on the reflecting layer 151, and a light may be diffused inside the output hole 153. Like this, the cover 150 may include only the diffusing layer 155, and perform a role of diffusing and emitting an output light of the projection lens 110. Alternatively, the cover 150 may include the diffusing layer 155 and the reflecting layer 151, and guide such that an output light of the projection lens 110 is emitted to a predetermined direction. For example, if an output light of the projection lens 110 is emitted to an upper direction or a vertical direction, the cover 150 may guide the output light to a side surface direction or a horizontal direction. However, the directivity of output lights of the projection lens 110 and the cover 150 are not limited thereto, and it may be modified in various ways to structures where at least a part of an output light emitted from the projection lens 110 passes through the cover 150 and converts the proceeding direction.

The upper surface of the cover 150 including the reflecting layer 151 (i.e., the outer surface of the reflecting layer 151) may include the same material as the outer surface of the main body 105 or the case 170. Also, the height of the cover 150 according to an embodiment of the disclosure may be a height where the upper surface of the main body 105 and the upper surface of the cover coincide in a coupled state.

If the cover 150 is coupled to the main body 105, the upper surface of the electronic device 100 may have a slick plane or curved surface. A user may couple the cover 150 to the main body 105 in a situation of not using the electronic device 100 or carrying the electronic device 100. The cover 150 may prevent damage to the projection lens 110 or introduction of foreign substances, and provide uniformity of the exterior.

The case 170 may be an independent component coupled to the main body 105, and it may cover a part or the entire area of the outer circumferential surface of the main body 105. However, the disclosure is not limited thereto, and the case 170 may be implemented as a component integrated with the main body 105, or it may be an accessory that can be attached to or detached from the main body 105. The case 170 may protect the main body 105, and the outer circumferential surface may include a material that prevents slipping so that a user can grip the electronic device 100.

The case 170 may be provided on the outer circumferential surface of the main body 105, and when the cover 150 becomes adjacent to the projection lens 110, the case 170 may receive an output light diffused from the cover 150. The case 170 may include an opening which is an area that surrounds the main body 105 and exposes the projection lens 110 to the outside, and the projection lens 110 may be opened or closed as the cover 150 is coupled to the opening of the case 170.

On one surface of the case 170, an audio output hole through which audio is output or a plurality of radiation holes which discharge heat or humidity inside the main body 105 may be formed. The case 170 may include a handle, and the outer shape of the case 170 may be implemented as various shapes such as a cylindrical shape, a box shape, a spherical shape, etc.

Figure 9:
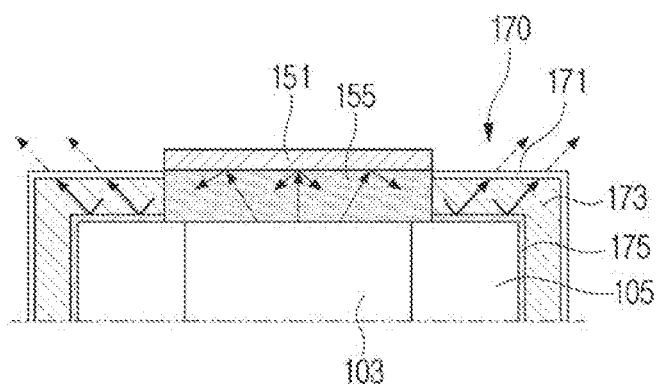
FIG. 9 is a cross-sectional view illustrating an output light of an electronic device according to an embodiment of the disclosure.

FIG. 9 is a cross-sectional view illustrating an output light of the electronic device 100 according to an embodiment of the disclosure.

Referring to FIG. 9, the cover 150 according to the disclosure may include a reflecting layer 151 and a diffusing layer 155, and the case 170 may have a dual structure as it includes an inner surface 175 and an outer surface 171.

The reflecting layer 151 of the cover 150 may be arranged to face the projection lens 110, and reflect an output light emitted from the projection lens 110. The inner surface of the reflecting layer 151 in the direction of the projection lens 110 (i.e., the lower surface of the reflecting layer 151) may include a metallic material having high light reflectance and reflect lights, and for example, it may be implemented as plastic in a bright color such as white and silver, a mirror, a metallic compound, or aluminum.

The lower surface of the reflecting layer 151 according to the various embodiments of the disclosure may be implemented to be rough, and induce diffused reflection of an output light. The reflecting layer 151 may induce diffused reflection such that an output light proceeds in a horizontal direction, and thereby prevent an output light emitted from the projection lens 110 from being reflected on the reflecting layer 151 and going back into the projection lens 110. Thus, the reflecting layer 151 may induce diffused reflection, and thereby prevent damage to the components such as a light source and a DMD chip arranged inside the main body 105, and overheating of the inside of the main body 105.

The diffusing layer 155 may be formed in the lower part of the reflecting layer 151, and thus it is more adjacent to the projection lens 110 than the reflecting layer 151, and it may diffuse an output light in a horizontal direction. The diffusing layer 155 may be implemented as a curvature lens that guides and diffuses an output light in a horizontal direction. Alternatively, the diffusing layer 155 may include a plurality of mirror particles in its inside to induce diffusion of an output light. The outer surface and/or the lower surface of the diffusing layer 155 may be coated with a transparent material such that an output light can pass through.

The cover 150 may include the reflecting layer 151 and the diffusing layer 155, and guide an output light emitted from the projection lens 110 to a predetermined direction, e.g., guide an output light in a vertical direction to a horizontal direction, and in an embodiment where the main body 105 includes the case 170, a guided output light may be transmitted to the inside of the case 170. In an embodiment not including the case 170, the cover 150 may guide an output light such that the light is diffused to all directions in 360 degrees based on the upper surface of the electronic device 100, and the electronic device 100 may control the color or the illuminance based on the transmission structure of the diffused output light and operate in the illumination mode, or output an image. The structure of the cover 150 according to the various embodiments of the disclosure will be described in detail with reference to FIG. 10A to FIG. 10D.

The case 170 may receive an output light from the diffusing layer 155 of the cover 150, and protect the main body 105. When the cover 150 is coupled, the case 170 may receive an output light from the diffusing layer 155 and emit the light, and the height of the case 170 may correspond to the upper surface of the cover 150, or correspond to the height of the diffusing layer 155.

The case 170 according to the various embodiments of the disclosure may have a dual structure as it includes an inner surface 175 facing the main body 105 and an outer surface 171 exposed to the outside of the electronic device 100. Also, between the inner surface 175 and the outer surface 171, a diffusing member 173 that diffuses an output light may be provided.

The inner surface 175 may reflect an output light in the direction of the outer surface 171, and the inner surface 175 may include a metallic material having high light reflectance and reflect lights. For example, the inner surface 175 may include the same material as the lower surface of the reflecting layer 151 of the cover 150. Alternatively, the inner surface 175 may be implemented as plastic in a grey color, a mirror, metal, or aluminum, and it may be coated with a material having high light reflectance.

The diffusing member 173 may diffuse a transmitted output light and guide the light to be transmitted to the inside of the case 170, and it may be implemented as a light diffusing medium. The diffusing member 173 may include a plurality of mirror particles in its inside to induce diffusion of an output light, or it may include patterning particles that induce scattering of an output light.

The outer surface 171 may emit at least a part of an output light to the outside of the electronic device 100. The outer surface 171 may include a light diffusing material which is transparent or in a bright color, and by the shape or structure of the outer surface 171, an output area of an output light that is diffused and emitted through the case 170, and the color, brightness, or clarity of the output light may be determined. The outer surface 171 may include a plane or a curved surface, and it may be implemented to have a cylindrical structure, a conical structure, a spherical structure, or a polygonal stereoscopic structure.

FIG. 10A to FIG. 10D are cross-sectional views of the cover 150 according to an embodiment of the disclosure.

Figure 10A:
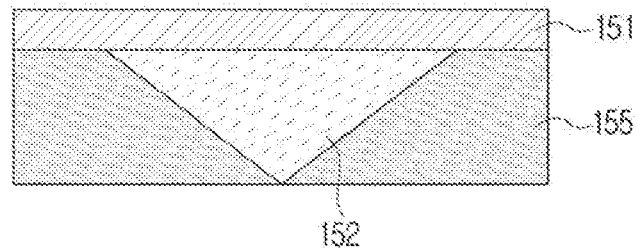
FIG. 10A is a cross-sectional view of a cover according to an embodiment of the disclosure.
Figure 10B:
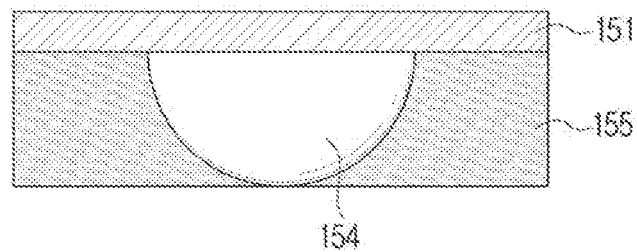
FIG. 10B is a cross-sectional view of a cover according to an embodiment of the disclosure.

Referring to FIG. 10A and FIG. 10B, the cover 150 according to an embodiment of the disclosure may include reflectors 152, 154.

The reflectors 152, 154 may be provided inside the cover 150, and reflect a light emitted from the projection lens 110 in a predetermined direction. Specifically, the reflectors 152, 154 may be provided inside the diffusing layer 155, and they may reflect and diffuse a light emitted from the projection lens 110 in a horizontal direction or a front surface direction such that the light is not reflected back to the projection lens 110.

The reflectors 152, 154 according to an embodiment of the disclosure may be stereoscopic structures that are projected from the upper surface of the cover 150, or from the reflecting layer 151 to the direction of the projection lens 110, and reflect an output light in a horizontal direction. The reflectors 152, 154 may be implemented as a single stereoscopic structure attached to the reflecting layer 151, or they may be implemented as a plurality of stereoscopic structures arranged.

As illustrated in FIG. 10A, the reflector 152 according to an embodiment of the disclosure may have a shape that extends from the reflecting layer 151 to the direction of the projection lens 110 and of which cross-sectional area decreases, or it may have a conical shape of which bottom surface is coupled to the lower surface of the reflecting layer 151. The cross-sectional area of the reflector 152 may be a circle or a polygon, and for example, it may reflect an output light transmitted in a vertical direction to a horizontal direction.

As illustrated in FIG. 10B, the reflector 154 according to another embodiment of the disclosure may have a hemispherical shape coupled to the reflecting layer 151, and the outer surface of the hemisphere may have a structure where at least one reflecting surface including a plurality of polygons or circles is arranged. In this case, the outer circumferential surface of the reflector 154 may have a mirror ball structure or a honeycomb structure, and each reflecting surface may be designed to reflect an output light and guide the light to a horizontal direction of the cover 150.

The reflecting surfaces formed on the outer surfaces of the reflectors 152, 154 may include a material having high light reflectance. The reflectors 152, 154 may include the same material as the reflecting layer 151 or the inner surface 175 of the case 170. Alternatively, the outer surfaces of the reflectors 152, 154 may be coated with a material having high light reflectance.

As the reflectors 152, 154 extend from the reflecting layer 151 to the direction of the projection lens 110, and their cross-sectional areas decrease, they may prevent an output light from being reflected to the direction of the projection lens 110 by the reflecting layer 151 or the diffusing layer 155 and entering into the main body 105, and they may also guide the output light to proceed in a horizontal direction.

Figure 10C:
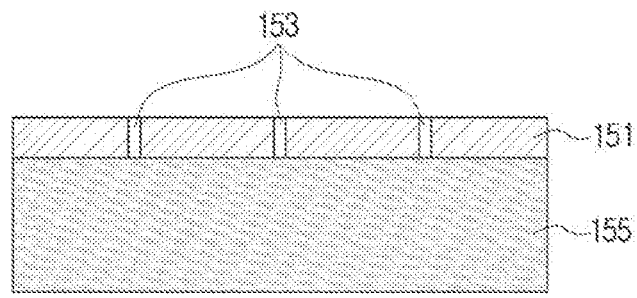
FIG. 10C is a cross-sectional view of a cover according to an embodiment of the disclosure.

Referring to FIG. 10C, the cover 150 according to an embodiment of the disclosure may include an output hole 153.

The output holes 153 may be an opening that is formed in a vertical direction to the reflecting layer 151 or an opening filled with a transparent body, and the cover 150 may project at least a part of an output light in a vertical direction through the output holes 153. The output holes 153 according to the various embodiments of the disclosure may be located in the center part of the reflecting layer 151, and prevent an output light from being specularly reflected and returning from the center of the reflecting layer 151 to the projection lens 110.

The cover 150 may include one output hole 153. In this case, an output light having a high illuminance value may be emitted through the output holes 153, and the output holes 153 may be utilized as a concentrated illumination or a pointer illumination. Also, at the upper surface of the output holes 153, a barrier film opening or closing the output holes 153 may be coupled or separated.

The areas, the shapes, the structures, or the number of the cross-sections of the output holes 153, and the light reflectance of the transparent body inside the output holes 153 may be implemented in various ways, and according to the structure of the output holes 153 and control of a light source, the electronic device 100 may output a video or an image through the output holes 153. Alternatively, the electronic device 100 may utilize the output holes 153 as a concentrated illumination. The inside of the output holes 153 may be empty, or filled with air. Alternatively, the diffusing layer 155 may be located to extend to the inside of the output holes 153 so as to correspond to the shape of the output holes 153.

Figure 10D:
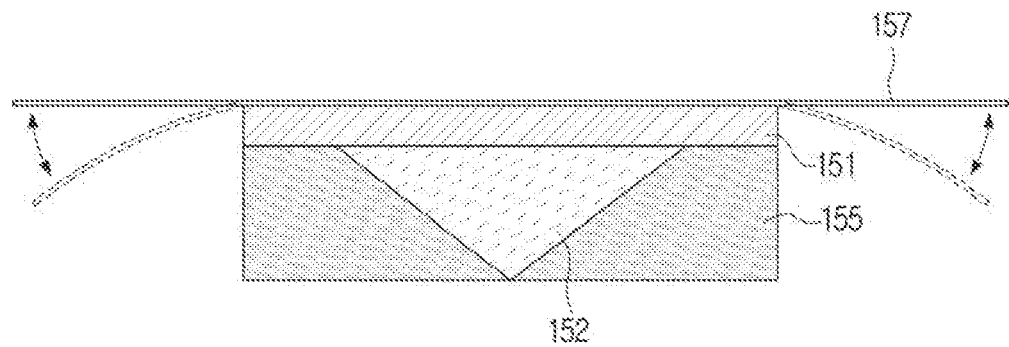
FIG. 10D is a cross-sectional view of a cover according to an embodiment of the disclosure.

Referring to FIG. 10D, the cover 150 according to an embodiment of the disclosure may include a reflecting plate 157.

The reflecting plate 157 is a reflecting film that extends in a horizontal direction of the reflecting layer 151, and the reflecting plate 157 may be bent in a lower direction, and its lower surface may include a light reflecting material. The lower surface of the reflecting plate 157 may include a metallic material having high light reflectance and it may reflect a light. Also, the lower surface may be coated with a mirror material.

In an embodiment where the reflecting plate 157 does not include the case 170 or a state where the cover 150 is not closely coupled to the main body 105 ('a first stage coupled state' that will be described below), leakage of an output light to the side surface direction of the cover 150 may be prevented, and an output light in the side surface direction may be smoothly diffused and induced to the direction of the case 170.

For example, the reflecting plate 157 may basically have a structure of being bent in the lower direction, and in case the cover 150 is separated from the main body 105 or in the first stage coupled state, the reflecting plate 157 may be maintained in a bent structure. Also, the reflecting plate 157 may be a structure which is spread flat and covers the upper part of the main body 105 if the cover 150 and the main body 105 are closely coupled.

At least a partial area of the reflecting plate 157 according to the various embodiments of the disclosure may include a light transmitting material or include a transmission hole, and an illumination light may be emitted to the upper part direction and/or the side surface part direction through the area, and an output light may be induced to be spread in a dim and wide range.

So far, explanation was made by suggesting the cover 150 including various structures and components as an example, and the electronic device 100 according to the various embodiments of the disclosure may simultaneously include at least one of the aforementioned structures. Alternatively, the electronic device 100 may maintain a basic structure, and may be implemented while being modified in various ways within a range that can be easily derived by a person having ordinary knowledge in the art.

Figure 11A:
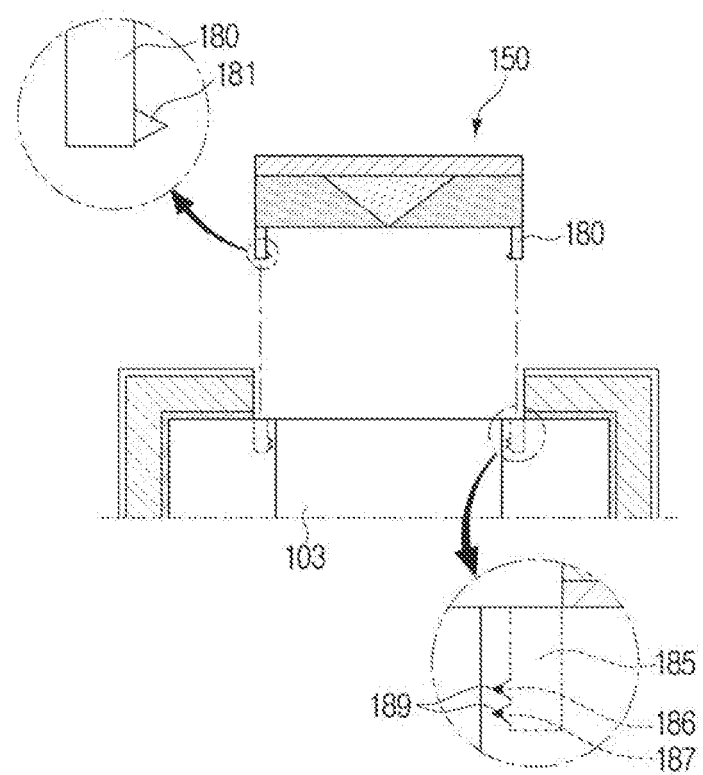
FIG. 11A is a cross-sectional view illustrating coupling between a main body and a cover according to an embodiment of the disclosure.

FIG. 11A is a cross-sectional view illustrating coupling between the main body 105 and the cover 150 according to an embodiment of the disclosure.

Referring to FIG. 11A, the cover 150 according to an embodiment of the disclosure may include a coupling column 180, and the main body 105 may include an accommodating groove 185.

The coupling column 180 may extend in the lower direction of the cover 150, and the coupling column 180 according to an embodiment of the disclosure may be formed in the lower part of the diffusing layer 155. The cover 150 may include one or a plurality of coupling columns 180. The coupling column 180 may have stereoscopic structures in various shapes such as a column, a cone, and a sphere.

On one surface of the coupling column 180, a recognition part 181 may be formed. The recognition part 181 may have a shape of being projected toward the center direction of the cover 150 as illustrated in FIG. 11A. However, the disclosure is not limited thereto, and the recognition part 181 may have a shape of being caved in toward the inside of the coupling column 180. Alternatively, the recognition part 181 may be implemented as an optical marker or an electronic marker that has a flat structure and that can be optically or electronically recognized by a first sensor 189.

The accommodating groove 185 may accommodate the coupling column 180 and the recognition part 181, and it may have a shape corresponding to the shape of the coupling column 180. The accommodating groove 185 may be located to be adjacent to the projection lens 110 of the main body 105. Also, the accommodating groove 185 may support the coupling column 180, and prevent the cover 150 from being detached from the main body 105 by an external force.

The first sensor 189 may be formed inside the accommodating groove 185, and recognize the location of the recognition part 181 and sense whether the cover 150 is coupled and the coupled state. The first sensor 189 may be implemented as sensors in various types such as an optical sensor, a physical sensor, and an electronic sensor to correspond to the recognition part 181.

The cover 150 may have a plurality of coupled states according to the state of being coupled to the main body 105 (e.g., the distance to the projection lens 110, and the degree of opening or closing of the projection lens 110), and the first sensor 189 may sense the coupled state of the cover 150.

Specifically, the first stage coupled state may be a state where the cover 150 and the projection lens 110 are coupled while being distanced from each other, and the second stage coupled state may be a state where the projection lens 110 is more closely coupled than the first stage coupled state. In this case, the first sensor 189 may recognize the recognition part 181 and recognize whether the cover 150 is coupled and the coupled state.

For example, the accommodating groove 185 may include a first seating part 186 and a second seating part 187 that have shapes corresponding to the structure of the recognition part 181, and on each of the first seating part 186 and the second seating part 187, the first sensor 189 may be formed. Also, the first sensor 189 may recognize on which one of the first seating part 186 or the second seating part 187 the recognition part 181 was seated, and thereby sense the location of the cover 150.

In case the recognition part 181 has a structure of being physically projected from or caved in toward the coupling column 180, the recognition part 181 may be coupled to the first seating part 186 or the second seating part 187 of the accommodating groove 185 and support the coupling of the cover 150 and the main body 105, and prevent detachment of the cover 150.

The accommodating groove 185 may have a cross-sectional area wider than the cross-sectional area of the coupling column 180, and the coupling column 180 and the recognition part 181 may include a material having elasticity. While the coupling column 180 is being inserted into the accommodating groove 185, the coupling column 180 and/or the recognition part 181 may be bent, and they may be restored as the recognition part 181 is coupled to the first seating part 186 or the second seating part 187. Alternatively, the recognition part 181 may enter into the accommodating groove 185 and inserted into the inside of the coupling column 180 as it is pushed by the accommodating groove 185. Also, if the recognition part 181 is adjacent to the first seating part 186 or the second seating part 187, the recognition part 181 may come outside the coupling column 180.

A user may couple the cover 150 and the main body 105 in the first or second stage coupled state according to a coupling operation (e.g., a force pushing the cover 150 or the number of times of pushing the cover 150), and the electronic device 100 may sense this and operate to correspond to the situation.

A recognition method of the first sensor 189 was described with reference to FIG. 11A, but in actual implementation, the method is not limited thereto, and may be implemented while being modified in various ways according to the structures, the types, and the locations of the first sensor 189 and the recognition part 181. For example, the first sensor 189 may be formed as an optical sensor or an electronic sensor and measure the separated distance between the main body 105 and the cover 150.

Figure 11B:
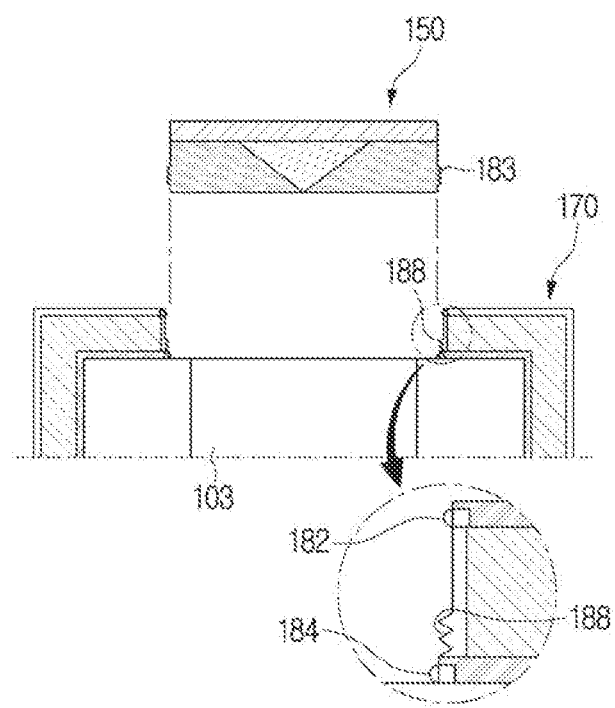
FIG. 11B is a cross-sectional view illustrating a coupling between a main body and a cover according to an embodiment of the disclosure.

FIG. 11B is a cross-sectional view illustrating coupling between the main body 105 and the cover 150 according to an embodiment of the disclosure.

Referring to FIG. 11B, the cover 150 according to an embodiment of the disclosure may include a projection part 183, and the main body 105 may include a concave part 188.

The projection part 183 may be formed on the outer circumferential surface of the cover 150, and formed on the outer side surface of the diffusing layer 155. The cover 150 may include one or a plurality of projection parts 183. The projection part 183 may have stereoscopic structures in various shapes such as a column, a cone, and a sphere, and the projection part 183 according to an embodiment of the disclosure may be implemented as a bolt including a thread.

The concave part 188 may have a structure corresponding to the shape of the projection part 183, and it may be located to be adjacent to the projection lens 110 of the main body 105. The concave part 188 according to an embodiment of the disclosure may be implemented as a nut including a thread. The concave part 188 may be coupled to the projection part 183 and support the cover 150, and prevent the cover 150 from being detached from the main body 105 by an external force. Alternatively, the coupling method of the concave part 188 and the projection part 183 may be identical to the coupling method of the coupling column 180 and the accommodating groove 185, or applied in a similar manner.

The second sensor 182, 184 (i.e., first sub sensor 182 and second sub sensor 184 make up the second sensor) may be formed on the main body 105, and recognize whether the projection part 183 and the accommodating part are coupled and thereby sense the location of the cover 150. The second sensor 182, 184 may include a first sub sensor 182 that is located in the upper part of the main body 105 where the cover 150 is coupled, and a second sub sensor 184 that is located in the lower part of the main body 105 where the cover 150 is closely coupled. The second sensor 182, 184 may be implemented as sensors in various types such as an optical sensor, a physical sensor, and an electronic sensor.

The first sub sensor 182 may sense whether the cover 150 and the main body 105 are coupled, and the second sub sensor 184 may sense whether the cover 150 and the main body 105 are in a state of being closely coupled. For example, if both of the first sub sensor 182 and the second sub sensor 184 are turned off, the cover 150 and the main body 105 may be in a separated state, and if the first sub sensor 182 is turned on and the second sub sensor 184 is turned off, the cover 150 and the main body 105 may be in the first stage coupled state where they are coupled while being distanced from each other, and if both of the first sub sensor 182 and the second sub sensor 184 are turned on, the cover 150 and the main body 105 may be in the second stage coupled state where they are closely coupled. In this case, the second sensor 182, 184 may recognize whether the accommodating part and the projection part 183 are coupled according to whether the first sub sensor 182 and the second sub sensor 184 are turned on/turned off, and recognize whether the cover 150 is coupled and the coupled state.

A user may couple the cover 150 and the main body 105 in the first or second stage coupled state through a coupling operation, e.g., an operation of coupling the projection part 183 and the concave part 188 by pushing in the cover 150 or rotating the cover 150, and the electronic device 100 may sense this and operate to correspond to the situation.

So far, a recognition method of the second sensor 182, 184 was described with reference to FIG. 11B, but in actual implementation, the method is not limited thereto, and may be implemented while being modified in various ways according to the structures, the types, and the locations of the first sensor 189 and the recognition part 181. For example, the second sensor 182, 184 may be formed as an optical sensor or an electronic sensor and measure the separated distance between the main body 105 and the cover 150 easily.

Figure 11C:
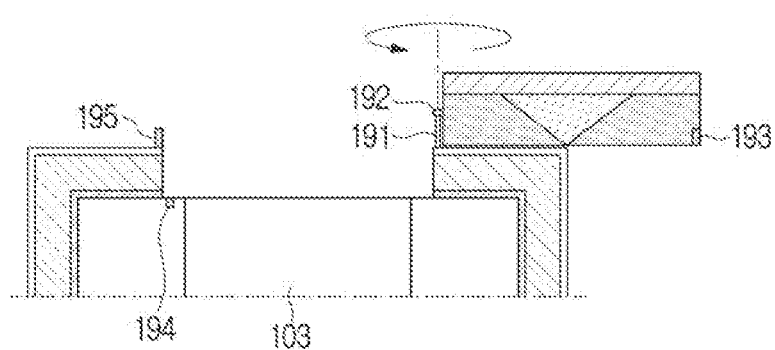
FIG. 11C is a cross-sectional view illustrating a coupling between a main body and a cover according to an embodiment of the disclosure.

FIG. 11C is a cross-sectional view illustrating coupling between the main body 105 and the cover 150 according to an embodiment of the disclosure.

Referring to FIG. 11C, the cover 150 according to an embodiment of the disclosure may include a rotating disk 192, and the main body 105 may include a rotating axis 191 and a third sensor 194.

The rotating axis 191 is a stick-shaped structure that is extended to the upper part of the main body 105, and it may be located to be adjacent to the coupled part of the cover 150 and the main body 105, and the rotating disk 192 may be rotatably coupled to the rotating axis 191. Also, the rotating disk 192 of the cover 150 may rotate around the rotating axis 191, and open or close the projection lens 110.

The rotating disk 192 may slide to the upper part or the lower part of the rotating axis 191, and the cover 150 may be distanced from or adhere to the projection lens 110 according to the movement of the rotating disk 192.

In an embodiment where the cover 150 and the main body 105 include the rotating disk 192 and the rotating axis 191, the cover 150 is not completely separated from the main body 105, and thus loss of the cover 150 can be prevented. Also, a user may intuitively move the cover 150, and in an embodiment, a driving device is provided in the rotating disk 192, and the electronic device 100 may automatically move the cover 150 by the processor 270.

The third sensor 194 may be formed on the main body 105, and sense the distance between the cover 150 and the main body 105. The third sensor 194 may be implemented as sensors in various types such as an optical sensor, a physical sensor, and an electronic sensor.

Each of a first magnetic body 193 and a second magnetic body 195 may be formed on the cover 150 and the main body 105, and attraction may operate between the first magnetic body 193 and the second magnetic body 195.

Specifically, the first magnetic body 193 may be formed on the opposite side of the rotating disk 192 on the cover 150, and the second magnetic body 195 may be formed on the opposite side of the rotating axis 191 on the main body 105 and face the first magnetic body 193 in the location where the cover 150 is coupled. Then, when the cover 150 rotates by the rotating disk 192 and the cover 150 is located on the upper surface of the projection lens 110, attraction may operate between the first magnetic body 193 and the second magnetic body 195 and they may pull each other, and fix the cover 150 in a stable location. The first magnetic body 193 and the second magnetic body 195 may be implemented as a magnet and a metallic material, or both of them may be implemented as magnets.

Figure 12:
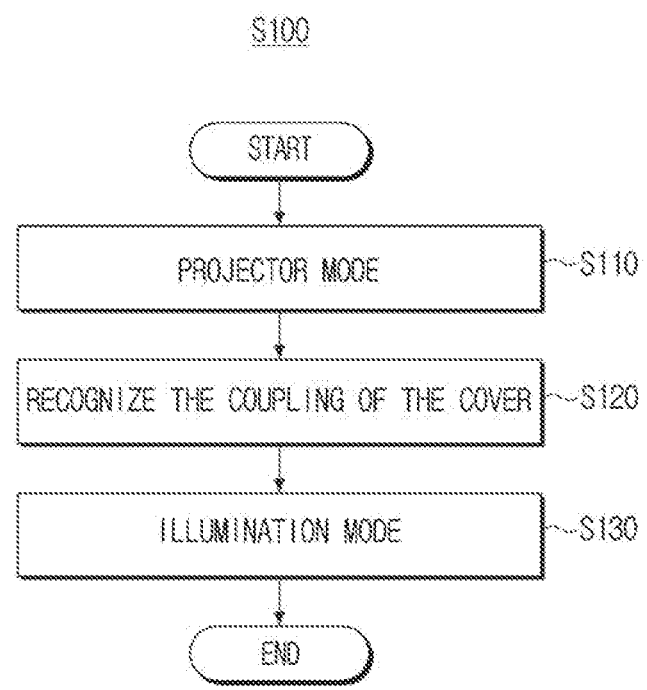
FIG. 12 is a flowchart for a method of controlling an electronic device according to an embodiment of the disclosure.

FIG. 12 is a flowchart regarding a method S100 of controlling the electronic device 100 according to an embodiment of the disclosure.

The electronic device 100 may be driven in a projector mode which is a general driving step, and a light source inside the main body 105 may emit an output light, and the output light may output an image through the projection lens 110 in operation S110. The light source may be driven by various driving methods of the projection part 210 described above in FIG. 2 by the driving of the processor 270, and the electronic device 100 may project a video or an image to a screen, and perform the main function of the projector.

During the driving S110 of the projector mode, the cover 150 that diffuses an output light to a horizontal direction may be coupled to the upper part of the projection lens 110 by a user or the processor 270 in operation S120. The sensor part may recognize whether the cover 150 is coupled and the coupled state, and transmit them to the processor 270.

When the coupling of the cover 150 is recognized, the light source may be controlled and the electronic device 100 may be driven in an illumination mode in operation S130. In the illumination mode, the processor 270 may reduce operation processing of the electronic device 100 compared to the projector mode, and the light source may emit a light of a single color, or project an image stored in the memory. Alternatively, the light source may adjust the projected location of the output light by the cover 150 or the case 170. Thus, in a situation where the electronic device 100 is not used as a display device, it may be utilized as an everyday illumination or a smart illumination.

Figure 13:
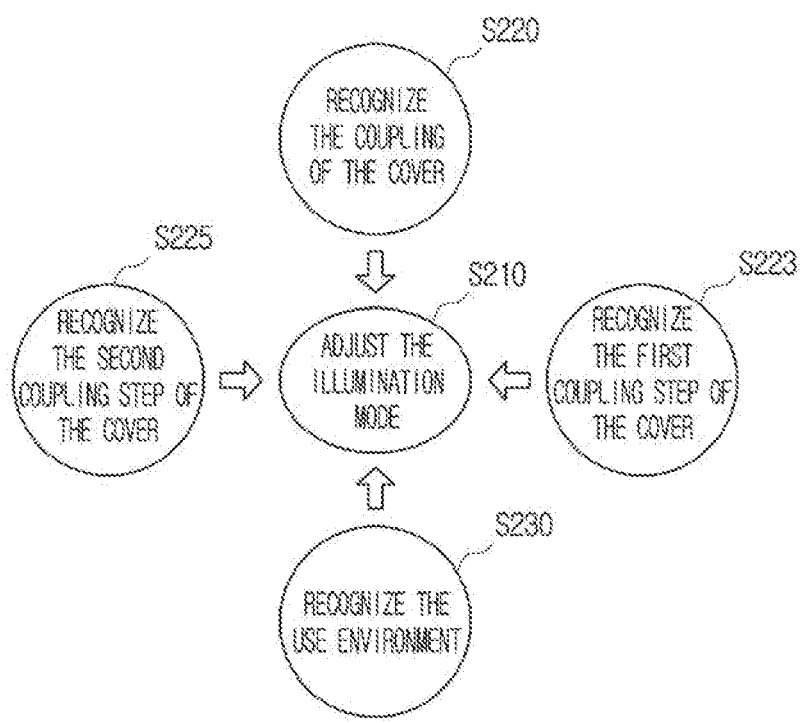
FIG. 13 is a flowchart for a method of controlling an electronic device according to an embodiment of the disclosure.

FIG. 13 is a flowchart regarding a method of controlling the electronic device 100 according to an embodiment of the disclosure.

Hereinafter, driving of the illumination mode of the electronic device 100 according to the various embodiments of the disclosure will be described in detail with reference to the flowchart in FIG. 13.

The operation of coupling the cover 150 and the main body 105 may include a plurality of coupling steps according to the distance between the cover 150 and the projection lens 110, and the processor 270 may recognize each coupling step through the sensor part 280.

For example, the sensor part 280 may recognize whether the cover 150 and the projection lens 110 are coupled in operation S220, recognize the first stage coupling where the cover 150 and the projection 110 are coupled while being distanced from each other in operation S223, or recognize the second stage coupling where the cover 150 and the projection lens 110 are more closely coupled than the first stage coupling in operation S225.

Then, the electronic device 100 may receive the coupled states S220, S223, S225 of the cover 150 from the sensor part, and adjust the driving of the illumination mode of the light source in various ways to correspond to these states in operation S210.

When the coupling of the cover 150 is recognized in operation S220, the electronic device 100 may convert from the projector mode to the illumination mode. Alternatively, in a state where the power of the electronic device 100 is turned off or in a standby state, the illumination mode may be driven.

When the first stage coupling of the cover 150 is recognized in operation S223, the electronic device 100 may adjust the light amount, the color of the output light, or the light emitting area such that the output light is diffused to the side surface direction of the cover 150 by the cover 150, and the light source corresponds thereto. Alternatively, the electronic device 100 may be driven according to the user's setting.

When the second stage coupling of the cover 150 is recognized in operation S225, the output light of the electronic device 100 is transferred to the case 170 by the cover 150 and the case 170, and the output light may be emitted through the outer circumferential surface of the case 170. The light source may be driven in a different method from the first operation (S223) correspondingly thereto, and in an embodiment, a softer and dimmer light may be emitted and a function of a mood lamp or an indirect illumination may be implemented.

Also, when the second stage coupling of the cover 150 is recognized in operation S225, the electronic device 100 may increase the driving of the radiation fan 290. As the output light is emitted from the outer circumferential surface of the case 170, the internal temperature of the main body 105 located inside the case 170 may rise, and the components arranged inside the main body 105 may be overheated. Thus, in the second stage coupling of the cover 150, the driving of the radiation fan 290 may be automatically increased, and the temperature or the humidity inside the main body 105 may thereby be adjusted.

In addition, the sensor part may sense the driving environment of the electronic device 100 (e.g., the brightness of the surroundings, the temperature and the humidity), and an operation of another illumination, or recognize a user's location, gesture, and operation through the aforementioned various sensors in operation S230. Then, the electronic device 100 may adjust the driving of the illumination mode of the light source in various ways in consideration of them in operation S210.

For example, the sensor part may recognize a user's location, and the electronic device 100 may not project an emitted light to the direction toward the user, or reduce the light amount or the amount of the blue light in the illumination mode.

The electronic device 100 may sense a user's location and movement, or store a life pattern of a user, and recognize the user's state, e.g., performing of various operations such as sleeping, reading, TV viewing, listening to music, dining, etc. based on them. Then, the electronic device 100 may control the light source to correspond to each operation of the user, and it may be utilized as a user-customized smart illumination.

For example, in case music is continuously output from the audio output part of the electronic device 100, or a user outputs audio without viewing a video, the electronic device 100 may control the driving of the light source in a corresponding manner to the sound source that is output or input, and implement an ambient effect.

Although embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic device comprising:
a main body;

a light source provided inside the main body, the light source being configured to emit an output light;

a projection lens configured to project the output light of the light source; and a cover configured to:
be selectively adjacent to or distanced from the projection lens,
open or close the projection lens, and
based on being adjacent to the projection lens, receive the output light projected by the projection lens and diffuse and emit the output light.

2. The electronic device of claim 1, wherein the cover comprises:
a reflecting layer configured to reflect the output light projected by the projection lens; and
a diffusing layer configured to diffuse the output light projected by the projection lens.

3. The electronic device of claim 2, wherein the reflecting layer is formed on one surface of the diffusing layer, and
wherein the reflecting layer is further configured to reflect the output light which passes through the diffusing layer.

4. The electronic device of claim 2, wherein an output hole is provided in the reflecting layer, and at least a part of the output light passes through the output hole to be emitted outside of the cover.

5. The electronic device of claim 4, wherein a portion of the diffusing layer extends inside the output hole and diffuses the output light inside the output hole.

6. The electronic device of claim 2, wherein the cover comprises a reflecting plate which extends in a side surface direction of the reflecting layer, the reflecting plate being bendable in a lower direction, and
wherein the reflecting plate includes a lower surface that comprises a light reflecting material.

7. The electronic device of claim 1, wherein the cover comprises a reflector provided inside the cover, the reflector being configured to reflect the output light projected by the projection lens in a predetermined direction.

8. The electronic device of claim 7, wherein the reflector has a shape which extends from an upper surface of the cover in a direction toward the projection lens, and
wherein the shape has a cross-sectional area that decreases from the upper surface of the cover to the projection lens.

9. The electronic device of claim 1, further comprising:
a case provided on an outer circumferential surface of the main body, the case being configured to, based on the cover being adjacent to the projection lens, receive the output light diffused from the cover,
wherein the case comprises an outer surface configured to emit at least a part of the output light, and an inner surface configured to reflect the output light.

10. The electronic device of claim 9, wherein the case further comprises a diffusing member configured to diffuse the output light between the outer surface and the inner surface.

11. A method of controlling an electronic device, the method comprising:
emitting an output light by a light source inside a main body;
outputting an image by projecting the output light passing through a projection lens;

coupling a cover which is adjacent to an upper part of the projection lens, wherein the cover is configured to receive and diffuse the output light projected by the projection lens; and driving the light source in an illumination mode by controlling the light source based on the coupling of the cover at a first distance from the projection lens; and driving the light source in a projector mode by controlling the light source based on the coupling of the cover at a second distance from the projection lens.

12. The method of claim 11, wherein the coupling of the cover comprises:
performing a first coupling of the cover and the projection lens while the cover and the projection lens are distanced from each other; and
performing a second coupling of the cover and the projection lens while the cover and the projection lens are less distanced from each other than in the first coupling, and
wherein the driving the light source in the illumination mode comprises:
recognizing the first coupling or the second coupling; and
controlling the driving of the light source to correspond to the recognized first coupling or the recognized second coupling.

13. The method of an electronic device of claim 12, wherein the performing of the second coupling comprises:
transmitting the output light diffused from the cover to a case enclosing an outer circumferential surface of the main body, and
emitting the output light in the illumination mode through the outer circumferential surface of the case.

14. The method of an electronic device of claim 12, wherein the driving the light source in the illumination mode further comprises, based on the second coupling being recognized, increasing driving of a cooling fan inside the main body.

15. The method of an electronic device of claim 11, further comprising:
after the coupling of the cover, recognizing a surrounding environment of the electronic device, a location of a user, and a state of the user,
wherein the driving the light source in the illumination mode comprises controlling the driving of the light source based on a result of the recognizing of the surrounding environment, the location of the user, and the state of the user.

16. An electronic device comprising:
a main body;
a light source provided inside the main body, the light source being configured to emit an output light;
a projection lens configured to project the output light of the light source; and
a cover detachably coupled to the main body to correspond to the projection lens,
wherein the cover receives, diffuses, and emits the output light emitted from the projection lens in a first mode when the cover is coupled to the main body at a first distance from the projection lens and in a second mode when the cover is coupled to the main body at a second distance from the projection lens.

* * * * *